(12) United States Patent
Tschirhart et al.

(10) Patent No.: US 11,837,959 B2
(45) Date of Patent: Dec. 5, 2023

(54) POWER SUPPLY SYSTEM AND CONTROL IN A DYNAMIC LOAD CONFIGURATION

(71) Applicant: Infineon Technologies Austria AG, Villach (AT)

(72) Inventors: Darryl Tschirhart, Cambridge (CA); Kushal Kshirsagar, Warwick, RI (US); Danny Clavette, Greene, RI (US); Prasan Kasturi, Sharon, MA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 17/379,166

(22) Filed: Jul. 19, 2021

(65) Prior Publication Data

US 2023/0013781 A1    Jan. 19, 2023

(51) Int. Cl.
*H02M 3/158*    (2006.01)
*H02M 1/00*     (2006.01)
*H02M 3/156*    (2006.01)

(52) U.S. Cl.
CPC ....... *H02M 3/1584* (2013.01); *H02M 1/0025* (2021.05); *H02M 3/1566* (2021.05)

(58) Field of Classification Search
None
See application file for complete search history.

(56) References Cited

U.S. PATENT DOCUMENTS

| 8,441,242 | B2* | 5/2013 | Ng | H02M 3/1584 |
| | | | | 323/283 |
| 9,356,516 | B2* | 5/2016 | Kusama | H02M 3/158 |
| 10,985,652 | B1* | 4/2021 | Jiang | G05F 1/618 |
| 11,237,582 | B2* | 2/2022 | Araki | G05F 1/565 |
| 11,418,121 | B2* | 8/2022 | Odell | H02M 3/33561 |
| 2014/0265885 | A1* | 9/2014 | Hu | H05B 45/48 |
| | | | | 307/31 |
| 2020/0321917 | A1* | 10/2020 | Nomiyama | H03G 3/30 |

OTHER PUBLICATIONS

Das, et al., "A Bidirectional Wide Load Range Multiphase Buck/Boost Converter for Differential Power Processing", 2017, IEEE, pp. 1-7, Authorized licensed use limited to: Infineon Technologies AG. Downloaded on Jun. 16, 2021 at 20:03:23 UTC from IEEE Xplore.

Barrado, A. et al., "New DC/DC converter with low output voltage and fast transient response", Eighteenth Annual IEEE Applied Power Electronics Conference and Exposition, 2003, APEC 03; [Annual Applied Power Electronics Conference], New York, NY: IEE, US. Feb. 9, 2003, pp. 432-437 vol. 1, XP032155935.

Extended Search Report, EP 22 18 5452, dated Nov. 17, 2022, pp. 1-9.

(Continued)

*Primary Examiner* — Jeffrey A Gblende
(74) *Attorney, Agent, or Firm* — Armis IP Law, LLC

(57) ABSTRACT

An apparatus includes a controller. The controller controls a main power supply to produce an output signal to power multiple dynamic loads such as disposed in series or other suitable configuration. The controller detects a transient power consumption condition associated with a first dynamic load of the multiple dynamic loads. The controller then adjusts control of the main power supply and generation of the output signal based on the detected transient power consumption condition.

39 Claims, 14 Drawing Sheets

(56) References Cited

OTHER PUBLICATIONS

Ng W T, et al., "Digitally controlled integrated DC-DC converters with fast transient response", Radio- Frequency Integration Technology, 2009. RFIT 2009. IEEE International Symposium on, IEEE, Piscataway, NJ, USA, Jan. 9, 2009 (Jan. 9, 2009), pp. 335-338, XP031640371.
Shenoy Pradeep S., "Differential Power Processing for DC Systems", IEEE Transactions on Power Electronics, vol. 28, No. 4, Apr. 1, 2013, pp. 1795-1806.

* cited by examiner

POWER SUPPLY SYSTEM AND CONTROL IN A DYNAMIC LOAD CONFIGURATION

BACKGROUND

As transistor density of digital circuits continues to increase, so does the corresponding current consumed by respective loads incorporating those transistors. To address this issue, it has been proposed to connect processor cores in series. In such an instance, a Main voltage regulator (a.k.a., VR) provides power to the series stack of processor core loads. Both the main voltage regulator and a corresponding Local voltage regulator (associated with each load) are ground referenced, while higher indexed Local VRs are referenced to the output of the lower-indexed VR.

If desired, the Main voltage regulator and Local voltage regulators can be implemented as multi-phase VRs. A main power supply provides floating power to each Local VR.

During operation, the main VR provides a current to the series stack of dynamic loads that is equal to the average demand of the processor cores. The Local voltage regulators, in turn, provide extra current to power a respective dynamic load when that corresponding load consumes more power than power supplied by the main power supply via the main supply current provided through each dynamic load. In a perfectly balanced system, each local VR theoretically provides no current. However, power consumption by respective loads can change without notice. In such an instance, the voltage regulator assigned to monitor the respective dynamic load supplies additional power to the dynamic load so that the voltage across the dynamic load does not fall below a respective threshold value.

BRIEF DESCRIPTION

Implementation of clean energy (or green technology) is very important to reduce our impact as humans on the environment. In general, clean energy includes any evolving methods and materials to reduce an overall toxicity of energy consumption on the environment.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, etc. Regardless of whether energy is received from green energy sources or non-green energy sources, it is desirable to make most efficient use of raw energy provided by such systems to reduce our impact on the environment. This disclosure contributes to reducing our carbon footprint (and green energy) via more efficient energy conversion.

Embodiments herein include novel ways of implementing control of one or more voltage regulators to a power a load.

More specifically, embodiments herein include an apparatus and/or system including a controller. The controller controls a main power supply to produce an output signal to power multiple dynamic loads such as disposed in series or other suitable configuration. The controller detects a transient power consumption condition associated with a first dynamic load of the multiple dynamic loads. The controller adjusts control of the main power supply and generation of the output signal based on the detected transient power consumption condition.

In a further example embodiment, the controller detects the transient power consumption condition based on a variation in a magnitude of the output signal.

In another example embodiment, the detected transient power consumption condition is a detected variation in a magnitude of a differential voltage powering the first dynamic load. In one embodiment, the differential voltage is derived from the output signal supplying current through a respective dynamic load. In further example embodiments, the controller: i) monitors a respective differential voltage across each of the multiple dynamic loads, and ii) adjusts control of the main power supply based on multiple simultaneous instances of detected transient power consumption conditions associated with the multiple dynamic loads.

In still further example embodiments, the controller receives a feedback signal from monitor hardware associated with the first dynamic load; the feedback indicates the transient power consumption condition associated with the first dynamic load.

In yet further example embodiments, the controller receives respective feedback signal associated with each dynamic load; the respective feedback indicates whether a corresponding transient power consumption condition exists for a respective dynamic load of the multiple dynamic loads.

Yet further embodiments herein include, via the controller, adjusting a magnitude of the output signal in response to the detected transient power consumption condition associated with the first dynamic load of the multiple dynamic loads. In one embodiment, the adjustment of the magnitude of the output signal reduces a magnitude of over-shoot or undershoot associated with a regulated voltage powering the first dynamic load.

In further example embodiments, the main power supply that produces the output signal includes a main power converter and an auxiliary power converter. The main power converter is operated by the controller to produce the output signal to power the dynamic loads during non-transient dynamic load conditions prior to detection of the transient power consumption condition. On an as-needed basis, the controller activates the auxiliary power converter to adjust a magnitude of the output signal in response to the transient power consumption condition associated with the first dynamic load.

In still further example embodiments, the controller operates an auxiliary converter of the main power supply in a discontinuous conduction mode in response to the detected transient power consumption condition.

In further example embodiments, the detected transient power condition is a first transient power consumption condition associated with the first dynamic load in a series stack of dynamic loads; the controller is further operative to: i) detect a second transient power consumption condition associated with a second dynamic load of the multiple dynamic loads, and ii) adjust control of the main power supply based on the detected first transient power consumption condition associated with the first dynamic load and the second transient power consumption condition associated with the second dynamic load.

Still further example embodiments herein include, via adjusted control of the main power supply: i) reduce a variation in a first voltage powering the first dynamic load with respect to a first setpoint voltage, and ii) increase a variation in a second voltage with respect to a second setpoint voltage, the second voltage powering a second dynamic load of the multiple dynamic loads.

Embodiments herein are useful over conventional techniques because implementation of a respective auxiliary power converter as discussed herein reduces a need for capacitance associated with each of multiple power converters. More specifically, embodiments herein include detecting a transient power consumption condition in a dynamic load disposed in a series stack of multiple dynamic loads and then applying a transient correction response (such positive or negative supplemental current via an auxiliary power converter) to all of the dynamic loads in the stack.

These and other more specific embodiments are disclosed in more detail below.

Note that although embodiments as discussed herein are applicable to power converters, the concepts disclosed herein may be advantageously applied to any other suitable topologies as well as general power supply control applications.

Note that any of the resources as discussed herein can include one or more computerized devices, controller, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to methods, systems, computer program products, etc., that support operations as discussed herein.

One embodiment herein includes a computer readable storage medium and/or system having instructions stored thereon. The instructions, when executed by computer processor hardware, cause the computer processor hardware (such as one or more co-located or disparately located processor devices) to: control a power supply to produce an output signal to power multiple dynamic loads disposed in series; detect a transient power consumption condition associated with or caused by a first dynamic load of the multiple dynamic loads; and adjust control of the power supply based on the detected transient power consumption condition.

The ordering of the steps above has been added for clarity sake. Note that any of the processing operations as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of implementing one or more inductor components to deliver current to a load. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
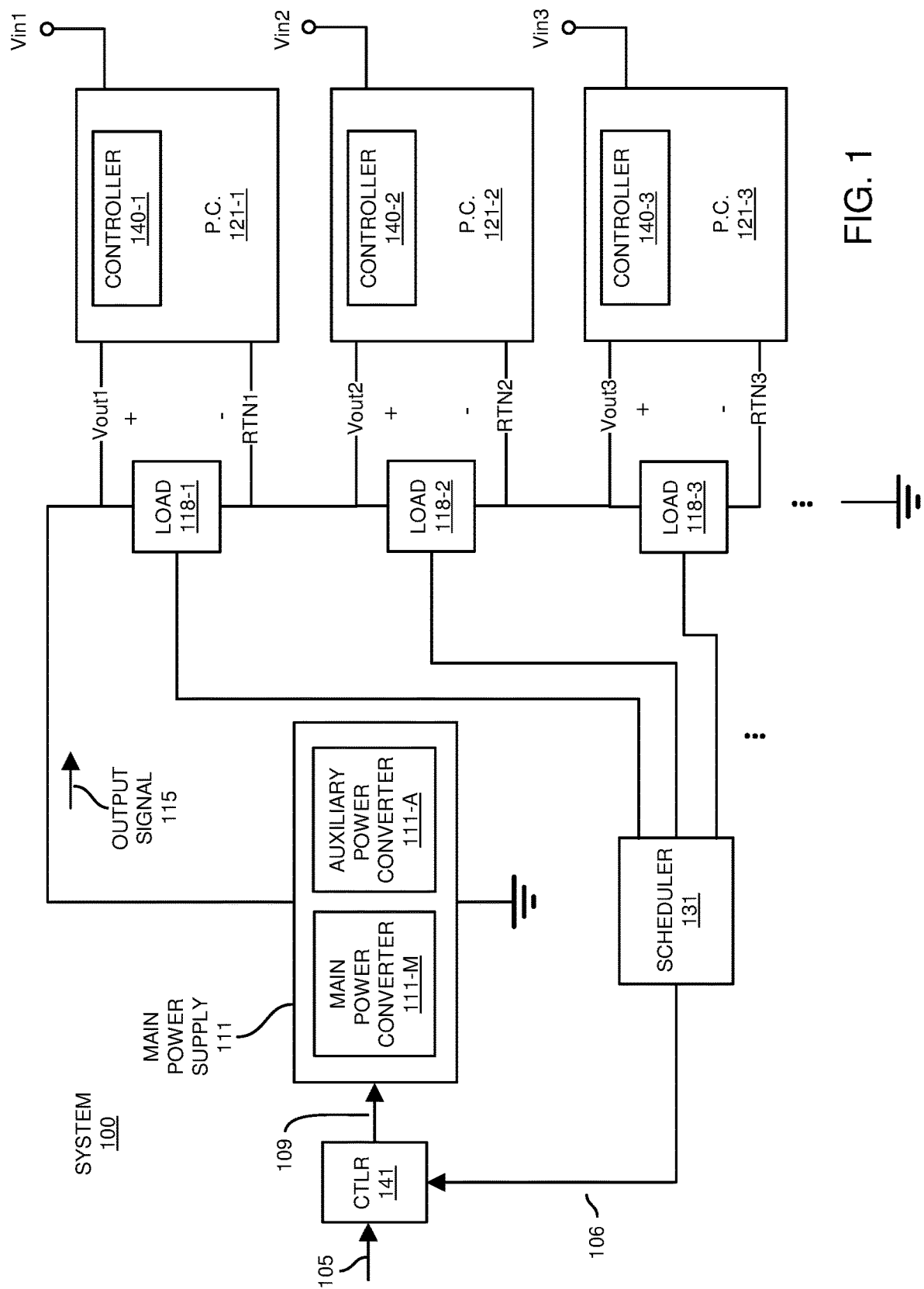
FIG. 1 is an example general diagram of a power supply including a main power supply and multiple power converters according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein include a controller disposed in a power supply. The controller controls a main power supply to produce an output signal to power multiple dynamic loads such as disposed in series. While generating the output signal, the controller detects a transient power consumption condition associated with delivering power to the multiple dynamic loads. For example, the transient power consumption condition causes a change in a respective voltage across a first dynamic load in the series stack. To at least partially accommodate the detected transient power consumption condition associated with the first dynamic load, the controller then adjusts control of the main power supply and generation of the output signal based on the detected transient power consumption condition.

Now, more specifically, FIG. 1 is an example general diagram of a power supply including a main power supply and multiple power converters according to embodiments herein.

In this example embodiment, system 100 includes controller 141, main power supply 111, scheduler 131, multiple dynamic loads 118-1, 118-2, 118-3, etc., and power converters 121-1, 121-2, 121-3, etc. Note that the system 100 can include any number of dynamic loads and corresponding power converters disposed in series and any number of corresponding power converters 121.

Main power supply 111 includes main power converter 111-M and auxiliary power converter 111-A. In one embodiment, the main power converter 111-M A (such as a buck converter or other suitable topology) is disposed in parallel with the auxiliary power converter 111-A (such as a buck converter or other suitable topology). Accordingly, embodiments herein include a main power converter 111-M and an auxiliary power converter 111-A connected in parallel to produce the output signal 115.

As further shown, each of the power converters 121 (such as voltage regulators or other suitable entities) includes a respective controller. For example, power converter 121-1 includes controller 140-1; power converter 121-2 includes controller 140-2; power converter 121-3 includes controller 140-3; and so on.

Note further that any of the components as described herein can be implemented as hardware, software, or a combination of hardware and software. For example, the scheduler 131 can be implemented as scheduler hardware, schedule software, or combination of scheduler hardware and software; controller 141 can be implemented as control hardware, controller software, or a combination of controller hardware and controller software; the controller 140-1 can be implemented as controller hardware, controller software, or combination of controller hardware and controller software; the controller 140-2 can be implemented as controller hardware, controller software, or combination of controller hardware and controller software; and so on.

As further shown, and as previously discussed, each of the dynamic loads is disposed in a series manner (such as in a stack) between the main power supply 111 and corresponding ground reference. The main power supply 111 produces the output signal 115 such as a supply voltage or supply current that passes through each of the dynamic loads 118-1, 118-2, 118-3, etc. The magnitude of the output signal 115 is relatively fixed during balanced conditions when each of the dynamic loads consumes a same amount of power. In such an instance, when each dynamic load consumes a same amount of power, the voltage across each respective dynamic load is substantially the same.

In addition to being powered via the output signal 115 produced by the main power supply 111, the individual power converters 121 provide supplemental positive or negative current to the respective dynamic load on an as-needed basis when the corresponding dynamic loads consume more or less power than would be provided by the output signal 115.

Further in this example embodiment, individual voltage sources supply power to the power converters 121. For example, the input voltage Vin1 powers the power converter 121-1; the input voltage Vin2 powers the power converter 121-2; the input voltage Vin3 powers the power converter 121-3; and so on.

Each of the dynamic loads 118 has its own local (floating) ground reference (labeled voltage RTN) that is independent of the ground associated with the power source 111. In general, as previously discussed, flow of the supply current provided by output signal 115 through each of the dynamic loads 118 results in generation of a respective voltage across the dynamic load.

As a more specific example, flow of supply current from output signal 115 through the dynamic load 118-1 results in a voltage of Vout1-RTN1 across the dynamic load 118-1; flow of supply current 115 through the dynamic load 118-2 results in a voltage of Vout2-RTN2 across the dynamic load 118-2; flow of supply current 115 through the dynamic load 118-3 results in a voltage of Vout3-RTN3 across the dynamic load 118-3; and so on.

Ideally, during balanced conditions, each of the dynamic loads 118 represents a substantially equal resistance (or impedance) such that each of the voltages Vout1-RTN1, Vout2-RTN2, Vout3-RTN3, etc., are substantially equal to each other. It is desirable to maintain a magnitude of the voltages across each of the dynamic loads at a substantially same fixed voltage setting. In one embodiment, each of the target voltages such as a first voltage applied to the load 118-1, second voltage applied to load 118-2, etc., are equal voltages. However, further embodiments herein include supplying unequal or different target voltages to the loads 118-1, 118-2, etc., without adversely affecting the behavior of this system. Thus, in one embodiment, it is desirable to maintain a magnitude of voltage across each of the dynamic loads at a corresponding assigned substantially fixed voltage setting. As discussed herein, embodiments herein include ensuring that a respective voltage across each dynamic load is substantially constant even if one or more of the dynamic loads happen to consume more or less current than expected.

Note that the dynamic loads 118 can be any suitable circuitry such as a stacked system with multiple printed circuit boards (each board being or having a dynamic load), multiple processors in the same semiconductor chip (each dynamic load being a processor core in the semiconductor chip), separate semiconductor chips, separate circuits, any combination of chips, circuits, etc.

In one embodiment, each of the dynamic loads 118 is a processor, processor system, circuitry, etc., that executes one or more instructions depending on a schedule generated by the scheduler 131. The scheduler 131 attempts to balance execution of the instructions such that each of the dynamic loads 118 consumes a substantially same amount of power for a given block of time and in which respective voltage drops across each dynamic loads are substantially equal. As previously discussed, when each of the dynamic loads consumes a same amount of power, the voltage across each dynamic load is substantially the same.

Based on the scheduling of instructions, and anticipated power needed by each of the dynamic loads to execute a respective set of scheduled instructions, the scheduler 131 produces the respective control signals 106 (or other suitable information) supplied to the power source 111. In one embodiment, the control signal 106 notifies the power source 111 how much current to supply through the series connection of dynamic loads 118 to accommodate the scheduled instructions for a given block of time.

As previously discussed, it is noted that there may be variation of power consumption by each of the dynamic loads. In such an instance, the voltage across the dynamic loads may vary and result in an over-voltage condition or under voltage condition that could damage the one or more dynamic loads. Embodiments herein include implementing a respective power converter (such as voltage regulator) that operates in a supervisory manner for each dynamic load to ensure that voltage across each dynamic load is substantially constant even if one or more of the dynamic loads happen to consume more or less current than expected.

For example, in one embodiment, power converter 121-1 monitors a respective voltage (Vout1-RTN1) across the dynamic load 118-1. During operation, the power converter 121-1 supplies positive supplemental current through the dynamic load 118-1 to prevent the voltage across the respective dynamic load from falling below a threshold level during a respective transient power consumption condition. Conversely, the power converter 121-1 supplies negative supplemental current through the dynamic load 118-1 to prevent the voltage across the dynamic load from rising above a threshold level during a transient power consumption condition. Each of the other power converters operates in a similar manner.

Without these current adjustments and prevention of the under-voltage and over-voltage conditions, the dynamic loads of system 100 could be damaged or not meet performance targets.

In accordance with further example embodiments, the controller 141 receives feedback 105 from any of one or more entities, nodes, etc., of the system to control generation of the output signal 115 that supplies power to each of the dynamic loads 118. Based on the received feedback 105 and the control signals 106, the controller 141 generates control signals 109. As further discussed herein, the control signals 109 control operation of the main power converter and/or auxiliary power converter 111-A to provide power to the dynamic loads.

For example, in one embodiment, based on the feedback 105, the controller 141 detects a transient power consumption condition associated with a first dynamic load of the multiple dynamic loads 118. The controller 141 may or may not be aware of which of the one or more multiple dynamic loads 118 experiences the transient power consumption condition. Nonetheless, as further discussed herein, based on the feedback 105, the controller 141 adjusts control of the power supply 111 based on the detected transient power consumption condition to reduce a variation of the voltage across one or more of the dynamic loads experiencing the transient power consumption condition.

Figure 2:
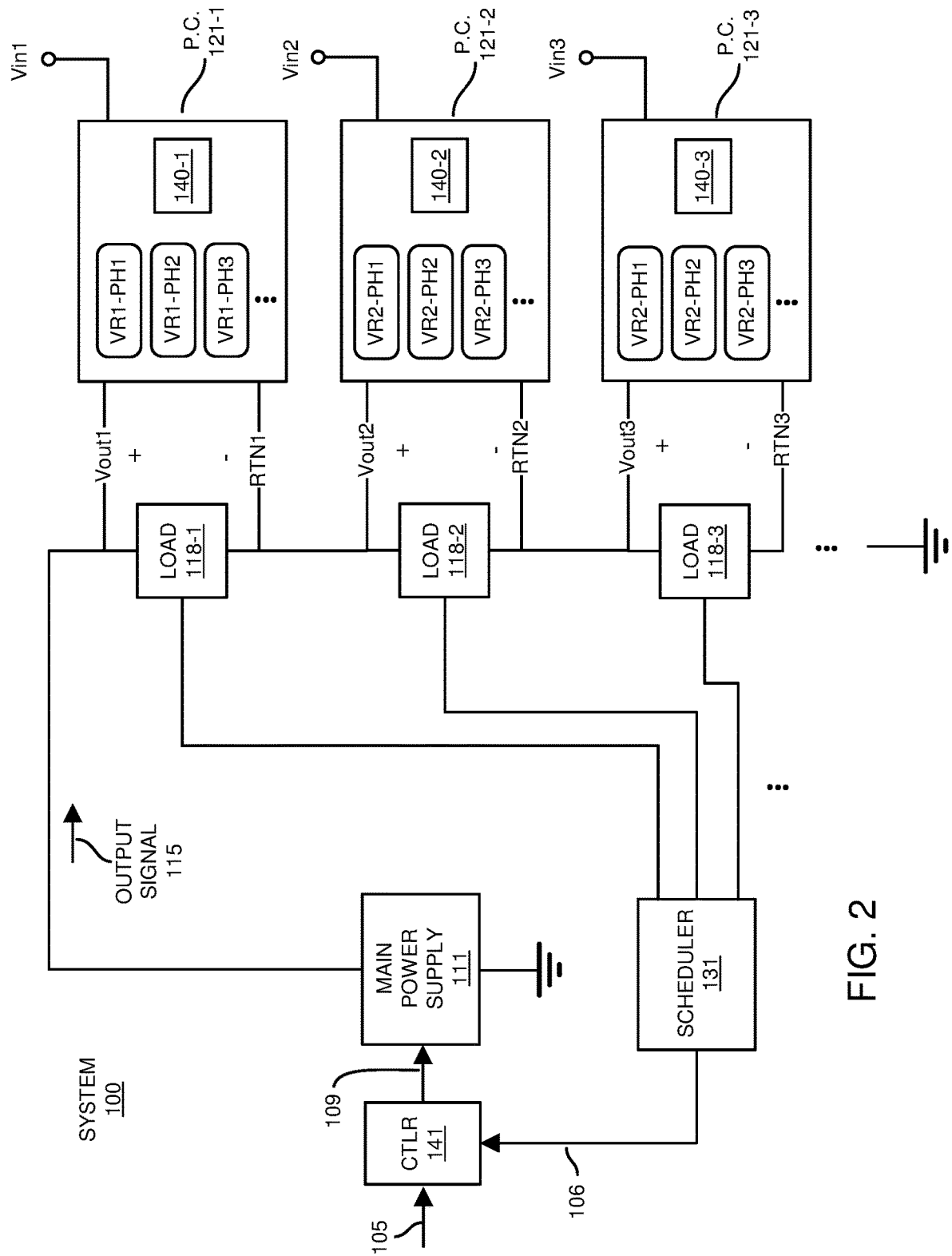
FIG. 2 is an example diagram illustrating implementation of multiple power converter phases in each respective power converter according to embodiments herein.

FIG. 2 is an example diagram illustrating implementation of a power converter including multiple power converter phases to maintain the voltage across a respective dynamic load according to embodiments herein.

In this example embodiment, the power converter 121-1 (such as a voltage regulator or other suitable entity) includes controller 140-1 as well as corresponding multiple power converter phases VR1-PH1 (power converter phase 1), VR1-PH2 (power converter phase 2), VR1-PH3 (power converter phase 3), and so on.

In one embodiment, each of the power converter phases in the power converter 121-1 are operated out of phase with respect to each other. Additionally, or alternatively, the multiple power converter phases are operated in phase with each other.

Further, in this example embodiment, the power converter 121-2 includes controller 140-2 as well as corresponding multiple power converter phases VR2-PH1 (power converter phase 1), VR2-PH2 (power converter phase 2), VR2-PH3 (power converter phase 3), and so on.

In one embodiment, each of the power converter phases in the power converter 121-2 are operated out of phase with respect to each other. Additionally, or alternatively, the multiple power converter phases are operated in phase with each other.

Still further in this example embodiment, the power converter 121-3 includes controller 140-3 as well as corresponding multiple power converter phases VR3-PH1 (power converter phase 1), VR3-PH2 (power converter phase 2), VR3-PH2 (power converter phase 3), and so on.

In one embodiment, each of the power converter phases in the power converter 121-3 are operated out of phase with respect to each other. Additionally, or alternatively, the multiple power converter phases are operated in phase with each other.

Figure 3:
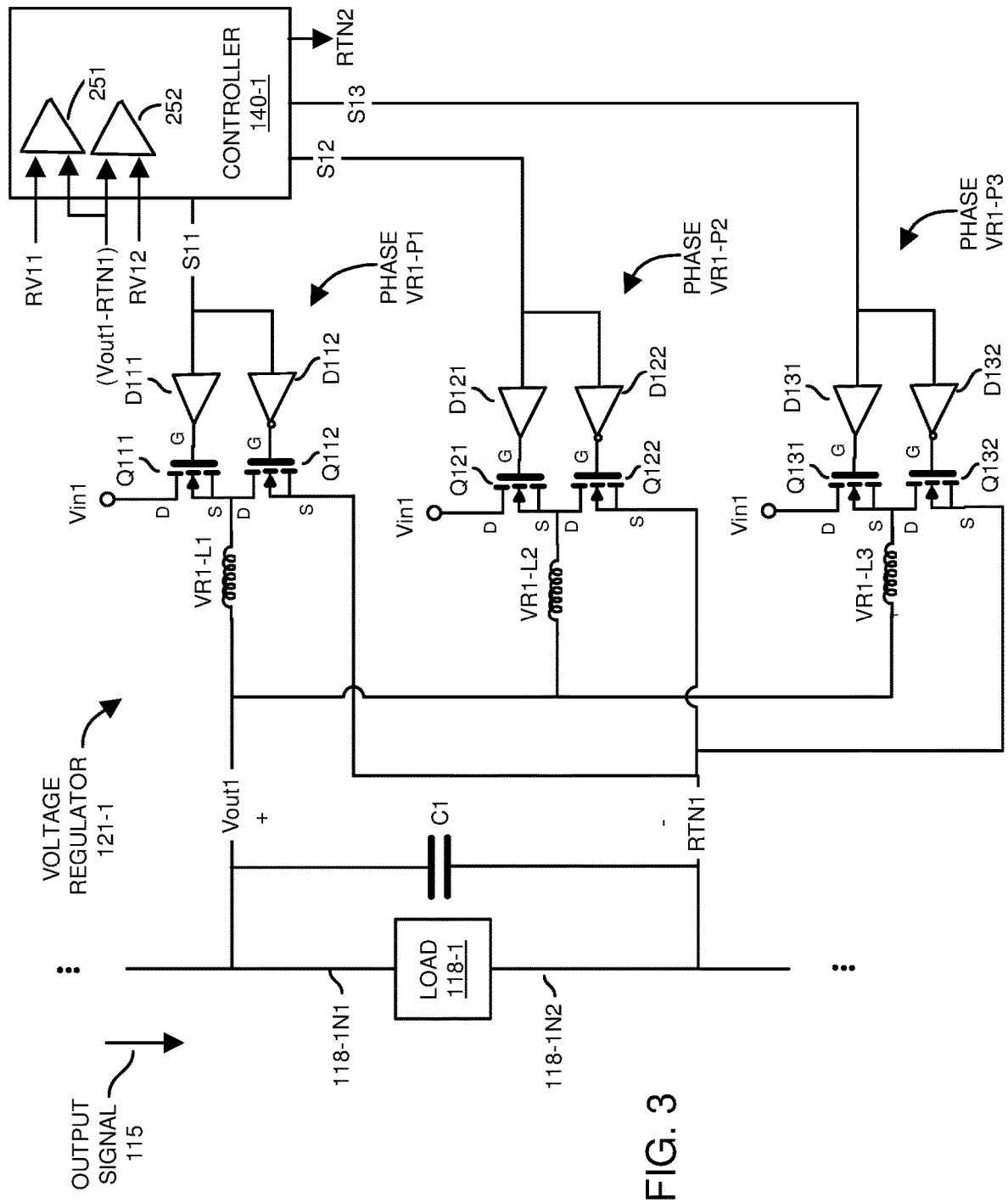
FIG. 3 is an example diagram illustrating a first power converter including multiple power converter phases operated to adjust current through a first dynamic load according to embodiments herein.

FIG. 3 is an example diagram illustrating a first power converter including multiple power converter phases that adjust current through a first dynamic load according to embodiments herein.

In this example embodiment, the power converter 121-1 includes capacitance C1 (such as one or more capacitors) and multiple power converter phases including power converter phase VR1-P1; power converter phase VR1-P2, and power converter phase VR1-P3. Note that the power converter 121-1 (a.k.a., VR1) can include any number of phases.

Power converter phase VR1-P1 includes inductor VR1-L1, switch Q111, switch Q112, driver D111, and driver D112. Note that any of the switches as discussed herein can be implemented in any suitable manner such as via MOS- FETs, semiconductor material including GaN and SiC; and any power semiconductor including BJT, IGBT, JFET, etc.

The switch Q111 and switch Q112 are connected in series between the local input voltage Vin1 and the local (floating) ground reference RTN1. For example, the drain (D) of switch Q111 is connected to receive the input voltage Vin1; the source (S) of switch Q111 is connected to the drain (D) of switch Q112; the source (S) of switch Q112 is connected to the ground reference RTN1. Inductor VR1-L1 is connected between the node 118-1N1 and the source node of switch Q111, which is connected to the drain node of switch Q112 as previously discussed.

Power converter phase VR1-P2 includes inductor VR1-L2, switch Q121, switch Q122, driver D121, and driver D122. The switch Q121 and switch Q122 are connected in series between the local input voltage Vin1 and the local (floating) ground reference RTN1. For example, the drain (D) of switch Q121 is connected to the input voltage Vin1; the source (S) of switch Q121 is connected to the drain (D) of switch Q122; the source (S) of switch Q122 is connected to the ground reference RTN1. Inductor VR1-L2 is connected between the node 118-1N1 and the source node of switch Q121, which is connected to the drain node of switch Q122 as previously discussed.

Power converter phase VR1-P3 includes inductor VR1-L3, switch Q131, switch Q132, driver D131, and driver D132. The switch Q131 and switch Q132 are connected in series between the local input voltage Vin1 and the local (floating) ground reference RTN1. For example, the drain (D) of switch Q131 is connected to the input voltage Vin1; the source (S) of switch Q131 is connected to the drain (D) of switch Q132; the source (S) of switch Q132 is connected to the ground reference RTN1. Inductor VR1-L3 is connected between the node 118-1N1 and the source node of switch Q131, which is connected to the drain node of switch Q132 as previously discussed.

As previously discussed, the power source 111 produces output signal 115 such as supply current that is destined to pass through the dynamic load 118-1. Ideally, the flow of supply current 115 through the dynamic load 118-1 results in a predetermined voltage drop (Vout1-RTN1). However, a magnitude of the corresponding dynamic load 118-1 may vary from an expected value as previously discussed.

In one embodiment, the controller 140-1 monitors one or more parameters of the power converter 121-1 (VR1) and the dynamic load 118-1 to determine whether to adjust an amount of current through the dynamic load 118-1. For example, in one embodiment, the controller 140-1 monitors the voltage Vout1-RTN1 and compares it to a reference voltage RV11 (such as upper voltage threshold level) via comparator 251. If the voltage Vout1-RTN1 crosses the reference voltage RV11 such as because the dynamic load 118-1 does not consume a sufficient amount of power, via implementation of negative supplemental current provided by the one or more power converter phases of power converter 121-1, the controller 140-1 activates one or more of the power converter phases in the power converter 121-1 to reduce the overall amount of current through the dynamic load 118-1. As further discussed herein in detail below, the controller 140-1 activates one or more of the power converter phases in the power converter 121-1 to control a magnitude of the voltage Vout1-RTN1 and prevent it from rising above a threshold level (such as the reference voltage RV11 or other suitable value).

Additionally, in one embodiment, the controller 140-1 monitors the voltage Vout1-RTN1 and compares it to a reference voltage RV12 (such as lower voltage threshold level) via comparator 252. If the voltage Vout1-RTN1 equals or crosses below the reference voltage RV12 such as because the dynamic load 118-1 requires more power than as provided by the supply current 115, to provide positive supplemental current by the one or more power converter phases of power converter 121-1, the controller 140-1 activates one or more of the power converter phases in the power converter 121-1 to increase the overall amount of current (such as provide positive supplemental current) through the dynamic load 118-1. This prevents the monitored voltage Vout1-RTN1 from falling below the lower threshold level RV12.

Figure 4:
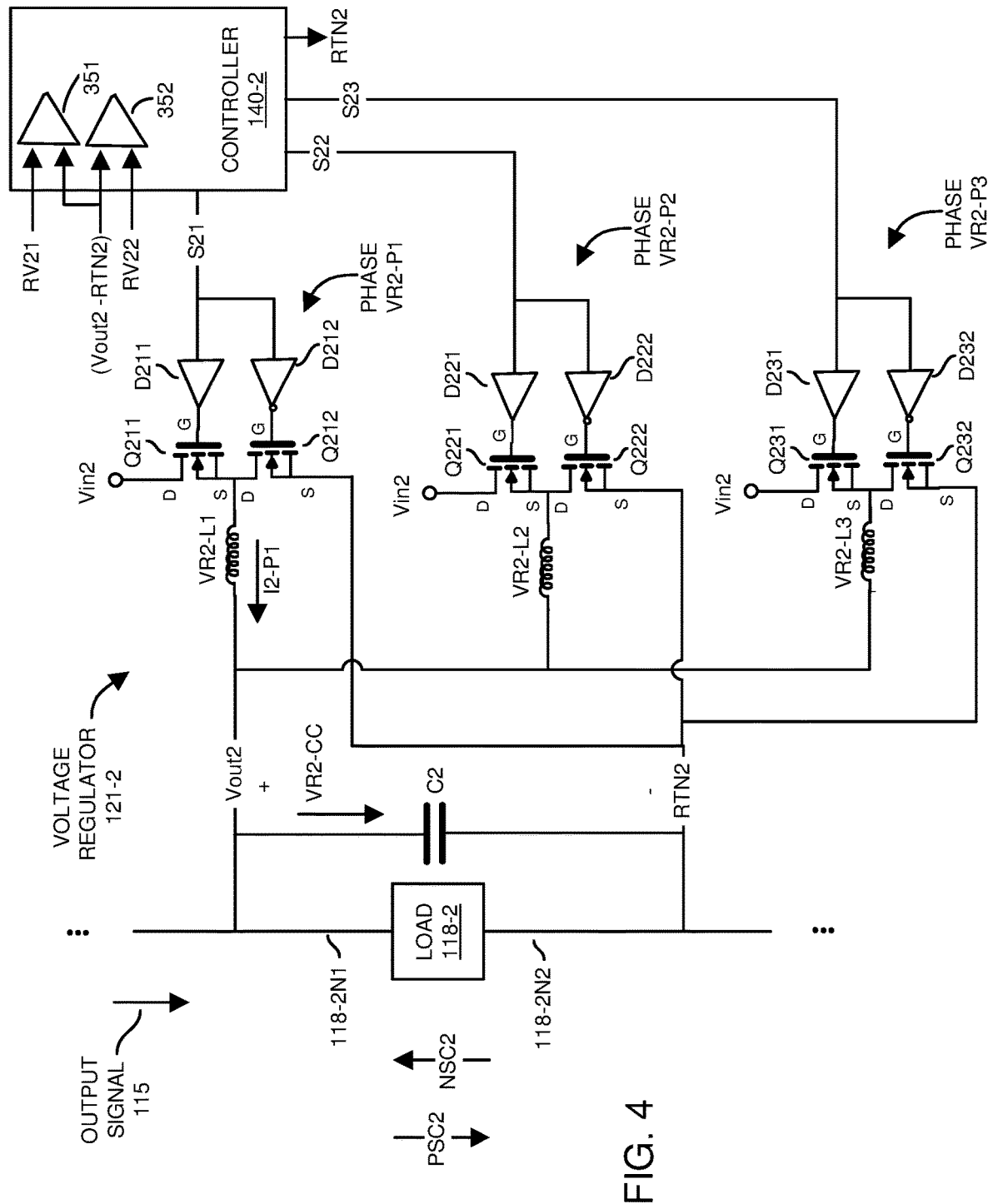
FIG. 4 is an example diagram illustrating a second power converter including multiple power converter phases operated to adjust current through a second dynamic load according to embodiments herein.

FIG. 4 is an example diagram illustrating a second power converter including multiple power converter phases that adjust current through a second dynamic load according to embodiments herein.

In this example embodiment, the power converter 121-2 includes capacitance C2 (such as one or more capacitors) and multiple power converter phases including power converter phase VR2-P1; power converter phase VR2-P2, and power converter phase VR2-P3. Note that the power converter 121-2 (a.k.a., VR2) can include any number of phases.

Power converter phase VR2-P1 includes inductor VR2-L1, switch Q211, switch Q212, driver D211, and driver D212. Note that any of the switches as discussed herein can be implemented in any suitable manner such as via MOSFETs, semiconductor material including GaN and SiC; and any power semiconductor including BJT, IGBT, JFET, etc.

The switch Q211 and switch Q212 are connected in series between the local input voltage Vin1 and the local (floating) ground reference RTN1. The drain (D) of switch Q211 is connected to the input voltage Vin2; the source (S) of switch Q211 is connected to the drain (D) of switch Q212; the source (S) of switch Q212 is connected to the ground reference RTN2. Inductor VR2-L1 is connected between the node 118-2N1 and the source node of switch Q211, which is connected to the drain node of switch Q212 as previously discussed.

Power converter phase VR2-P2 includes inductor VR2-L2, switch Q221, switch Q222, driver D221, and driver D222. The switch Q221 and switch Q222 are connected in series between the local input voltage Vin2 and the local (floating) ground reference RTN2. The drain (D) of switch Q221 is connected to the input voltage Vin2; the source (S) of switch Q221 is connected to the drain (D) of switch Q222; the source (S) of switch Q222 is connected to the ground reference RTN2. Inductor VR2-L2 is connected between the node 118-2N1 and the source node of switch Q221, which is connected to the drain node of switch Q222 as previously discussed.

Power converter phase VR2-P3 includes inductor VR2-L3, switch Q231, switch Q232, driver D231, and driver D232. The switch Q231 and switch Q232 are connected in series between the local input voltage Vin2 and the local (floating) ground reference RTN2. The drain (D) of switch Q231 is connected to the input voltage Vin2; the source (S) of switch Q231 is connected to the drain (D) of switch Q232; the source (S) of switch Q232 is connected to the ground reference RTN2. Inductor VR2-L3 is connected between the Vout1 node and the source node of switch Q231, which is connected to the drain node of switch Q232 as previously discussed.

As previously discussed, the power source 111 produces supply current 115 that is destined to pass through the dynamic loads 118-1, 118-2, etc. Ideally, the flow of supply current 115 through the dynamic load 118-2 results in a predetermined voltage drop (Vout2-RTN2). However, a magnitude of the corresponding dynamic load may vary from an expected value as previously discussed.

In one embodiment, the controller 140-2 monitors one or more parameters of the power converter 121-1 (VR2) and the dynamic load 118-2 to determine whether to adjust an amount of current through the dynamic load 118-2. For example, in one embodiment, the controller 140-2 monitors the voltage Vout2-RTN2 and compares it to a reference voltage RV21 via comparator 351. If the voltage Vout2-RTN2 crosses above the reference voltage RV21 such as because the dynamic load 118-2 does not consume a sufficient amount of power, the controller 140-2 activates one or more of the power converter phases in the power converter 121-2 to reduce the overall amount of current through the dynamic load 118-2. As further discussed herein in detail below, the controller 140-2 activates one or more of the power converter phases in the power converter 121-2 to prevent the voltage Vout2-RTN2 from rising above a threshold level (such as the reference voltage RV21 or other suitable value).

Additionally, in one embodiment, the controller 140-2 monitors the voltage Vout2-RTN2 and compares it to a reference voltage RV22 (such as lower voltage threshold level) via comparator 352. If the voltage Vout2-RTN2 equals or crosses below the reference voltage RV22 such as because the dynamic load 118-2 requires more power than as provided by the supply current 115, to provide positive supplemental current by the one or more power converter phases of power converter 121-2, the controller 140-2 activates one or more of the power converter phases in the power converter 121-2 to increase the overall amount of current through the dynamic load 118-2. This prevents the monitored voltage Vout2-RTN2 from falling below the lower threshold level RV22. As previously discussed, each of the power converters includes circuitry as shown in FIG. 4.

Figure 5:
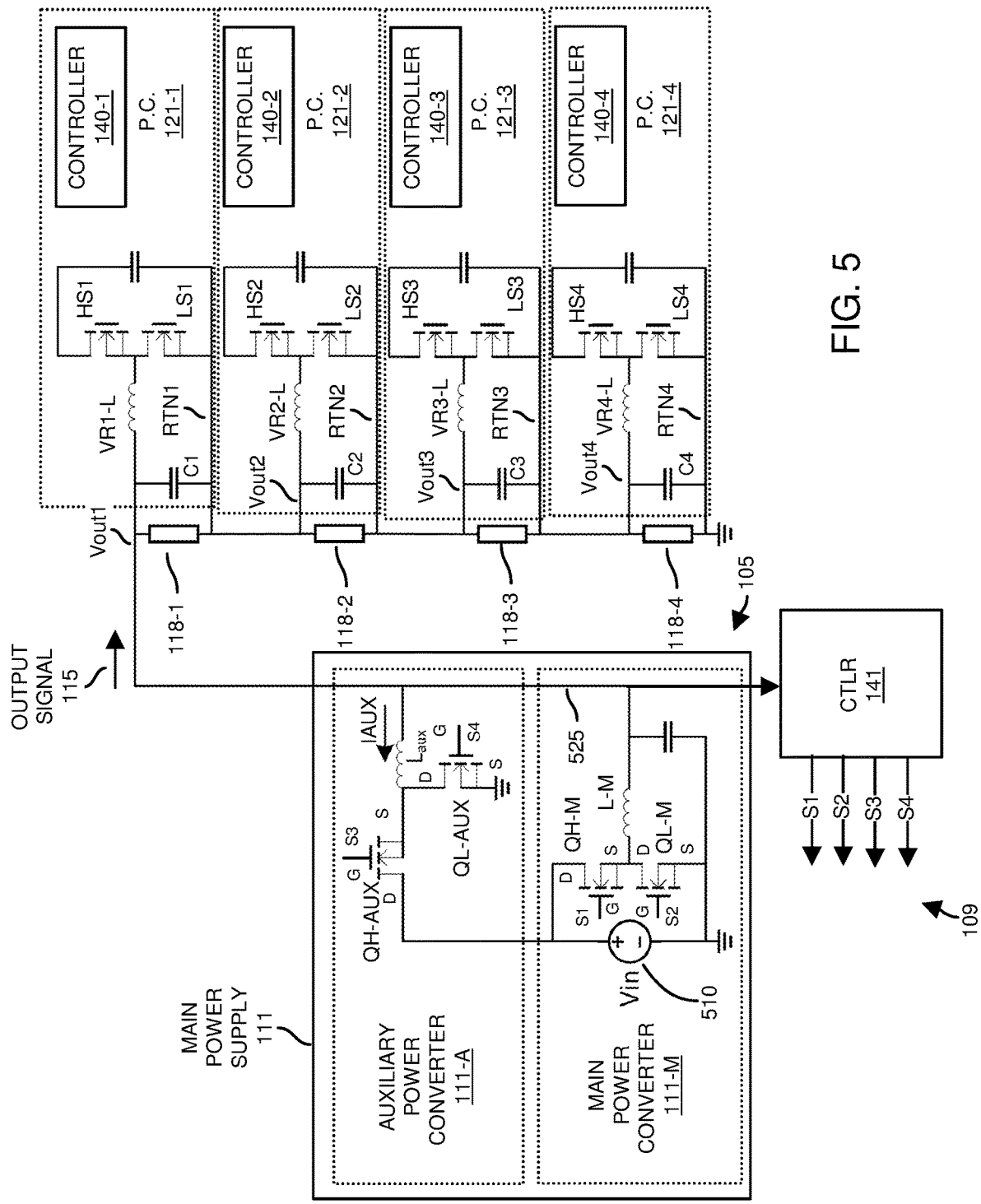
FIG. 5 is an example diagram illustrating control of a main power converter and an auxiliary power converter to produce an output signal powering a series stack of dynamic loads based on monitoring a magnitude of an output signal according to embodiments herein.

FIG. 5 is an example diagram illustrating control of a main power converter and an auxiliary power converter to produce an output signal powering a series stack of dynamic loads based on monitoring a magnitude of the output signal according to embodiments herein.

In this example embodiment, the main power converter 111-M of the main power supply 111 includes high side switch circuitry QH-M, low side switch circuitry QL-M, and inductor L-M. Such circuitry represents one or more power converter phases operative to produce the output signal 115.

High side switch circuitry QH-M and low side switch circuitry QL-M are disposed in series between the input voltage source 510 (which supplies input voltage, Vin) and a ground reference.

As previously discussed, the controller 141 receives control signals 106 (or other suitable message information) indicating, for example, a magnitude of current associated with generating the output signal 115. Via generation of the control signals 51 driving the gate node(s) of high side switch circuitry QH-M and control signals S2 driving the gate node(s) of the low side switch circuitry QL-M, the controller 141 controls a flow of current through the inductance L-M to produce the output signal 115 at the desired voltage or current magnitude.

As its name suggests, the main power converter 111-M supplies a bulk of the power to the stacks of dynamic loads 118. For example, during steady state conditions when each of the respective dynamic loads 118 consumes a same amount of power, the respective voltage across each of the dynamic loads is substantially equal. In such an instance, there is no need to activate the auxiliary power converter 111-A.

As further shown, the main power supply 111 include auxiliary power converter 111-A. Auxiliary power converter 111-A includes one or more power converter phases such as high side switch circuitry QH-AUX and low side switch circuitry QL-AUX disposed in series between the input voltage source 510 (supplying input voltage Vin) and a ground reference. Switched control of high side switch circuitry QL-AUX and the low side switch circuitry QH-AUX results in positive or negative current Iaux through the inductor Laux.

As previously discussed, the controller 141 receives feedback 105 indicating, for example, whether one or more of the dynamic loads experiences a respective transient power consumption condition. In this example embodiment, the feedback 105 represents the voltage at node 525 supplying the output signal 115 (such as output current) to the stack of dynamic loads. In other words, the controller 141 monitors the output signal 115 to determine presence or absence of a transient power consumption condition associated with one or more of the dynamic loads 118.

In one embodiment, in response to detecting a respective transient power consumption condition, such as detected based on a variation in the output signal 115, the controller 141 generates controls signals S3 driving the gate(s) of high side switch circuitry QH-AUX and control signals S4 driving the gate(s) of low side switch circuitry QL-AUX.

Via generation of the control signals S3 driving the gate node(s) of high side switch circuitry QH-AUX and control signals S4 driving the gate node(s) of the low side switch circuitry QL-AUXM, the controller 141 controls a flow of positive or negative supplemental current through the inductance Laux (one or more inductors) to produce the output signal 115 at the desired magnitude of voltage or current. In other words, in response to detecting a respective transient power consumption condition, the controller 141 activates and controls the auxiliary power converter 111-A to produce the output signal 115 at the desired magnitude of voltage or current.

In one embodiment, the magnitude of the current Iaux produced by the auxiliary power converter 111-A varies depending on a magnitude of a difference between the monitored voltage across a respective dynamic load and the reference voltage. For example, when a detected variation associated with one or more of the dynamic loads is large, the magnitude of the Iaux current generated by the auxiliary power converter 111-AUX is large; when a detected variation on the dynamic load is small, the magnitude of the Iaux current generated by the auxiliary power converter 111-AUX is small.

Accordingly, embodiments herein include multiple power converter stage (an auxiliary power converter 111-A and main power converter 111-M) including multiple switches QH-M, QL-M, QH-AUX, QL-AUX; states of the multiple switches are controlled based on respective feedback signals such as from the multiple dynamic loads 118 and/or power converters 121.

Figure 6:
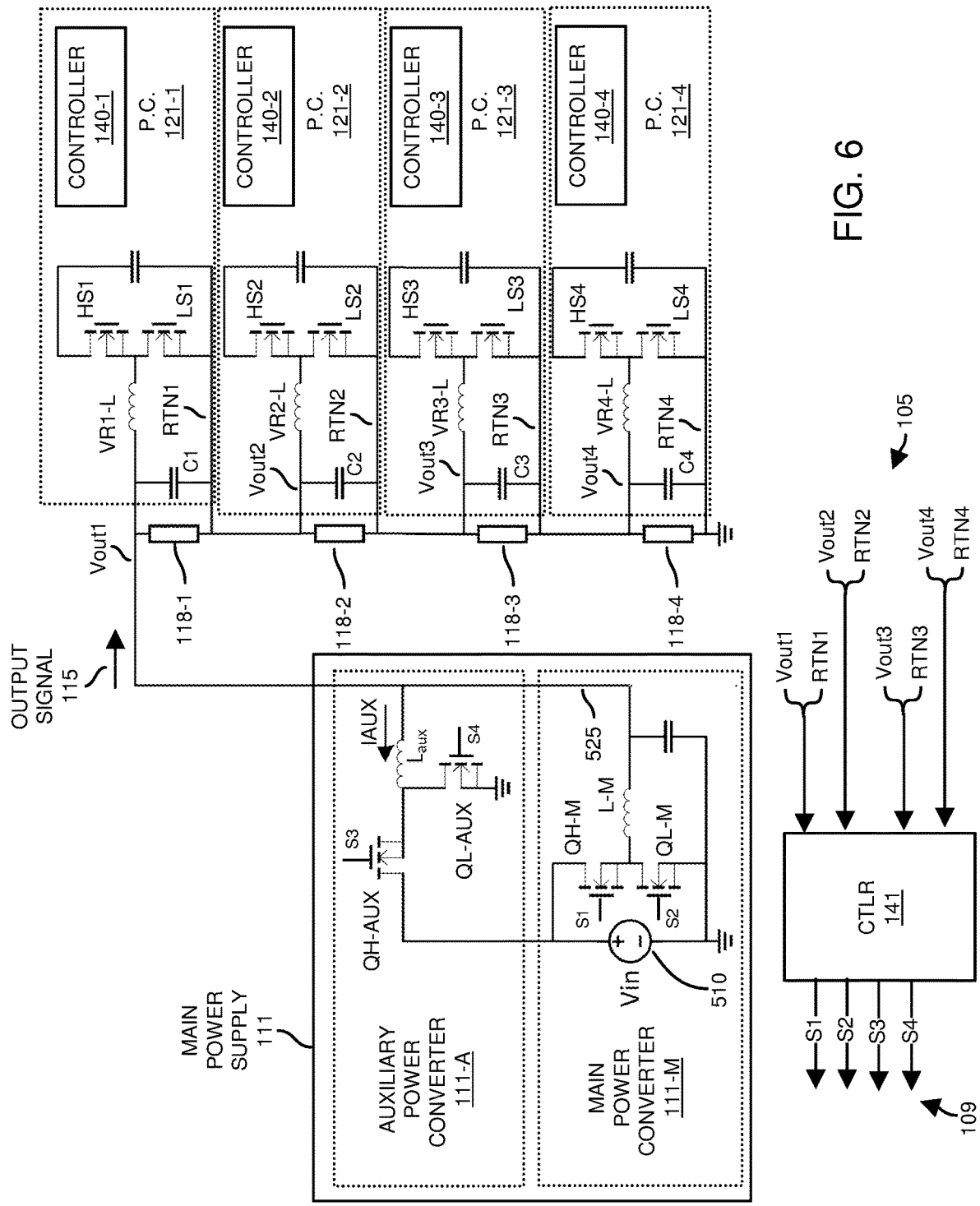
FIG. 6 is an example diagram illustrating control of a main power converter and an auxiliary power converter to produce an output signal powering a series stack of dynamic loads based on feedback monitoring a respective magnitude of voltage across each respective dynamic load according to embodiments herein.

FIG. 6 is an example diagram illustrating control of a main power converter and an auxiliary power converter to produce an output signal powering a series stack of dynamic loads based on monitoring a respective magnitude of voltage across each respective dynamic load according to embodiments herein.

As previously discussed, the controller 141 receives feedback 105 indicating, for example, whether one or more of the dynamic loads 118 experiences a respective transient power consumption condition.

In this example embodiment, the feedback 105 represents or includes a respective voltage across each of the respective dynamic loads 118.

The magnitude of the voltages across the dynamic loads can be sensed at any suitable location. For example, the controller in each of the power converters can be configured to include appropriate circuitry to measure each voltage across the dynamic loads (monitored voltage such as Vout1-RTN1, Vout2-RTN2, Vout3-RTN3, etc.). Additionally, or alternatively, the circuitry to measure and monitor the voltage across respective dynamic loads can be located in the controller 141.

Via controller 141 or other suitable entity, measurement and comparison of each of the monitored voltages with respect to a threshold value provides an indication whether the dynamic load experiences a transient power consumption condition, which can be positive or negative. For example, if the measured voltage across a respective dynamic load is less than a desired reference voltage, then the dynamic load is experiencing a transient increase in power consumption. Conversely, if the measured voltage across a respective dynamic load is greater than a reference voltage, then the dynamic load is experiencing a transient decrease in power consumption.

Each power converter 121-1, 121-2, 121-3, etc. implements a corresponding feedback control loop to maintain a magnitude of the voltage across a respective dynamic load to a desired reference value. During a transient power consumption condition, the respective power converter assigned to the dynamic load supplies positive or negative supplemental current to the dynamic load. Additionally, to reduce overshoot and undershoot associated with the voltage across the dynamic load experiencing the transient power consumption condition, as further shown below, embodiments herein include activating the auxiliary power converter 111-AUX as well based on the feedback from individual power converters.

In one embodiment, in response to detecting a respective transient power consumption condition as indicated by one or more of the monitored voltages being different than a desired reference voltage value, the controller 141 generates controls signals S3 driving the gate(s) of high side switch circuitry QH-AUX and control signals S4 driving the gate(s) of low side switch circuitry QL-AUX.

Via generation of the control signals S3 driving the gate node(s) of high side switch circuitry QH-AUX and control signals S4 driving the gate node(s) of the low side switch circuitry QL-AUXM, the controller 141 controls a flow of positive or negative supplemental current through the inductance Laux (one or more inductors) as a response to the detected transient power consumption condition associated with one or more of the dynamic loads.

As further discussed herein, activation of the auxiliary power converter to either sink or source current to the stack of dynamic loads helps to maintain the voltage across each of the dynamic loads 118. More specifically, implementation of the auxiliary power converter 111-A and sinking and sourcing of supplemental current through the dynamic loads reduces a size of respective capacitors needed in each power converter 121-1.

In other words, because the auxiliary power converter 111-A sinks or sources current to the series connection of dynamic loads on an as-needed basis, the need for corresponding capacitance in each power converter is reduced as the auxiliary power converter 111-A sinks or sources current as opposed to a respective power converter needing to sink or source needed extra current.

Figure 7:
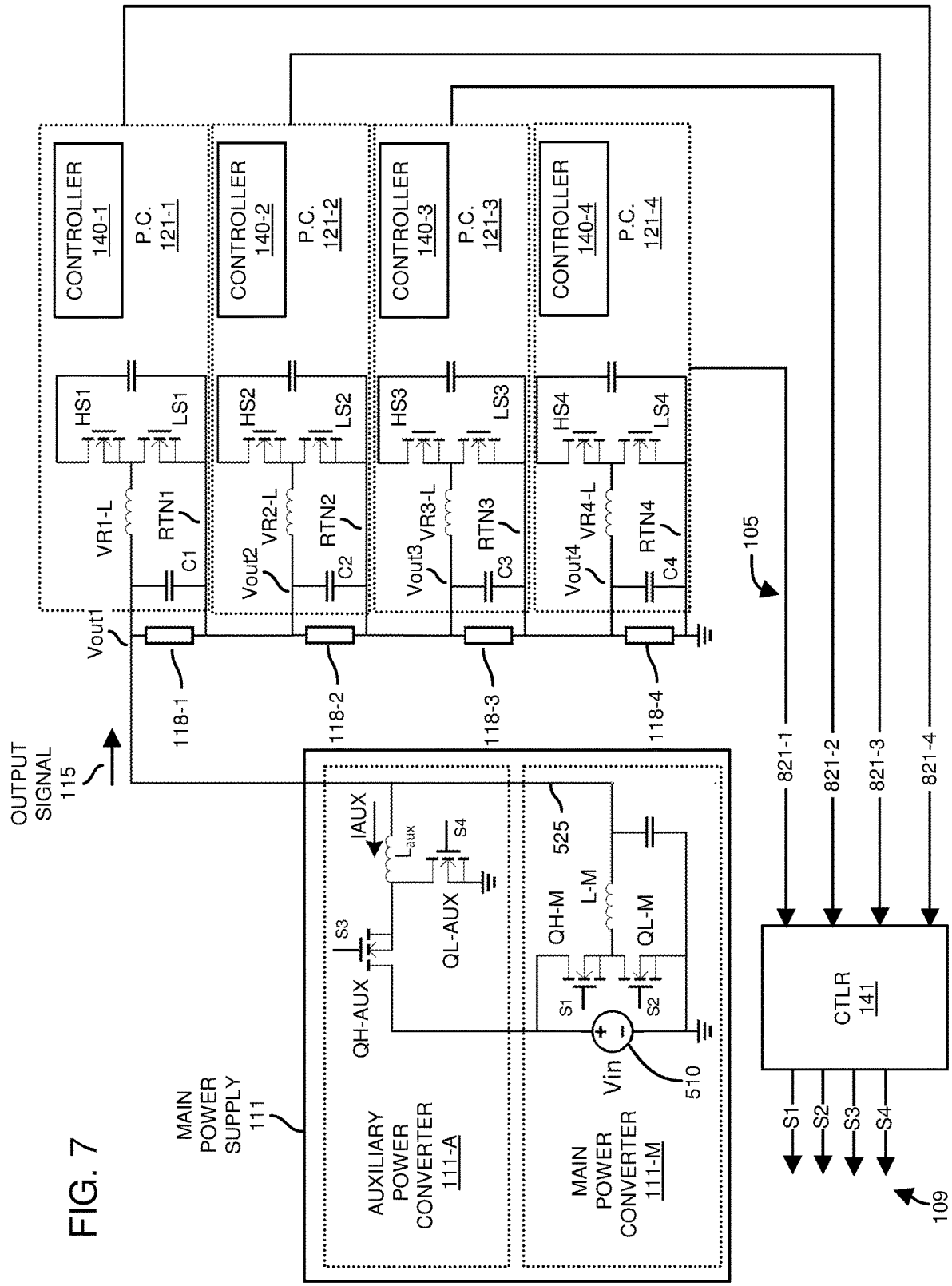
FIG. 7 is an example diagram illustrating control of a main power converter and an auxiliary power converter to produce an output signal powering a series stack of dynamic loads based on feedback from multiple power converters according to embodiments herein.

FIG. 7 is an example diagram illustrating control of a main power converter and an auxiliary power converter to produce an output signal powering a series stack of dynamic loads based on feedback from multiple voltage regulators according to embodiments herein.

In this example embodiment, each of the respective power converters monitor for transient power consumption conditions associated with a respective dynamic load. In response to detecting a transient power consumption condition, the corresponding controller operates respective high side switch circuitry and low side switch circuitry to provide either positive or negative supplemental current (with respect to output signal 115) to maintain the magnitude of the voltage across the dynamic load at a desired voltage level.

In one embodiment, the respective controller of the power converter generates a respective control signal and/or status information indicating a degree of the transient power consumption condition experienced by the respective dynamic load.

For example, the controller 140-1 monitors one or more parameters such as a magnitude of voltage (Vout1-RTN1) across the dynamic load 118-1. The controller 140-1 produces control signal 821-1 to indicate a degree to which the dynamic load 118-1 experiences a transient power consumption condition.

The control signal 821-1 (part of feedback 105) can be implemented in any suitable manner. For example, the control signal can be implemented as a multi-bit signal indicating a magnitude and polarity (over consumption or under consumption of power) of the transient power consumption condition. In accordance with further embodiments, the control signal 821-1 can be implemented as a current or voltage signal, a magnitude of which indicates a degree to which the respective dynamic load 118-1 experiences the transient power consumption condition.

Regardless of the implementation, via the control signal 821-1, the controller 141 receives information indicating the magnitude and polarity of the transient power consumption condition.

The controller 140-2 associated with power converter 121-2 monitors one or more parameters such as a magnitude of voltage (Vout2-RTN2) across the dynamic load 118-2. The controller 140-2 produces control signal 821-2 to indicate a degree to which the dynamic load 118-2 experiences a transient power consumption condition.

The control signal 821-2 can be implemented in any suitable manner. For example, the control signal 821-2 (such as part of feedback 105) can be implemented as a multi-bit signal indicating a magnitude and polarity (over consumption or under consumption of power) of the transient power consumption condition. In accordance with further embodiments, the control signal 821-2 can be implemented as such as current of voltage, a magnitude of which indicates a degree to which the respective dynamic load 118-2 experiences the transient power consumption condition. Regardless of implementation, via the control signal 821-2, the controller 141 receives status information indicating the magnitude and polarity of the transient power consumption condition experienced by the dynamic load 118-2.

The controller 140-3 monitors one or more parameters such as a magnitude of voltage (Vout3-RTN3) across the dynamic load 118-3. The controller 140-3 produces control signal 821-3 to indicate a degree to which the dynamic load 118-3 experiences a transient power consumption condition.

The control signal 821-3 can be implemented in any suitable manner. For example, the control signal can be implemented as a multi-bit signal indicating a magnitude and polarity (over consumption or under consumption of power) of the transient power consumption condition. In accordance with further embodiments, the control signal 821-3 can be implemented as such as current of voltage, a magnitude of which indicates a degree to which the respective dynamic load 118-3 experiences the transient power consumption condition. Regardless of implementation, via the control signal 821-3, the controller 141 receives status information indicating the magnitude and polarity of the transient power consumption condition.

As further discussed below, based on received control signals 821-1, 821-2, 821-3, etc., the controller 141 decides whether to activate the auxiliary power converter 111-AUX and, if so, whether the auxiliary power converter 111-AUX provides positive or negative current.

Figure 8:
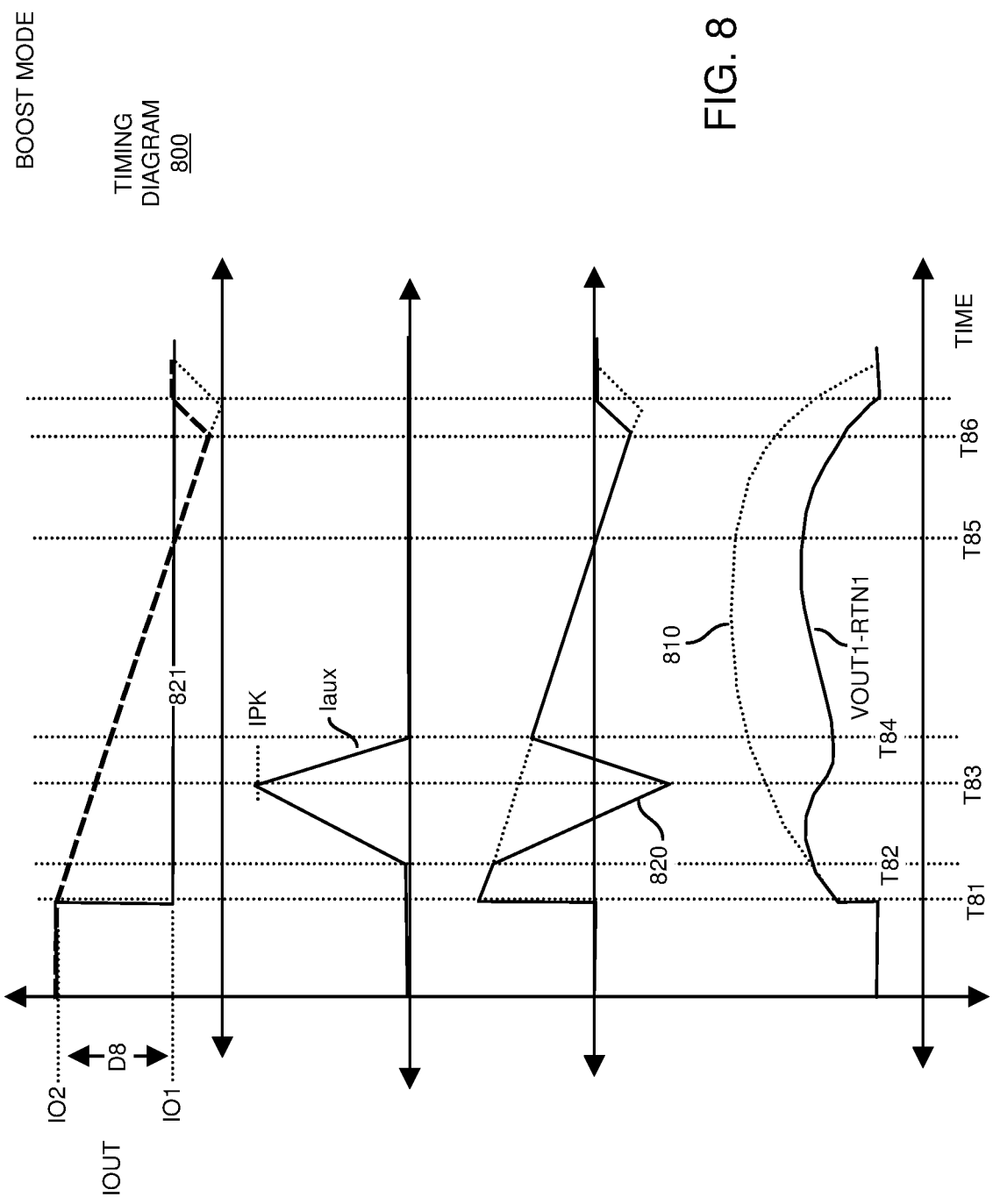
FIG. 8 is an example timing diagram illustrating operation of an auxiliary power converter in a boost mode to reduce variation of a voltage across a dynamic load in a series stack according to embodiments herein.

FIG. 8 is an example timing diagram illustrating operation of an auxiliary power converter in a boost mode to reduce variation of a voltage across a dynamic load according to embodiments herein. Note that the auxiliary current flows from the low potential (Vout1+Vout2+Vout3+Vout4) to high potential (Vin).

In this example embodiment as shown in timing diagram 800, assume that the dynamic load 118-1 experiences a transient power consumption condition in which the dynamic load 118-1 consumes less power (as indicated by step down from IO2 to IO1, delta D8) than an amount of power provided by the output signal 115. Assume that none of the other dynamic loads 118-2, 118-3, etc., in the stack experiences a transient power consumption condition between at least T81 and T86.

In such an instance, as previously discussed, the power converter 121-1 operates in a so-called boost mode to provide negative supplemental current through the dynamic load 118-1 to maintain the voltage (Vout1-RTN1) at a desired voltage level. Dashed line 810 indicates the voltage (Vout1-RTN1) increase (overshoot) that would occur without activating the auxiliary power converter 111-AUX as further discussed below. The capacitor current 820 (associated with capacitor C1) varies between time T81 and T87 as shown.

The feedback 105 indicates the transient power consumption condition associated with the dynamic load 118-1 at or around time T81.

In response to detecting the transient power consumption condition associated with the dynamic load 118-1, in addition to the power converter 121-1 controlling the magnitude of the voltage across the dynamic load 118-1, the controller 141 initiates activation of the auxiliary power converter 111-AUX in a buck mode to generate supplemental current Iaux, which reduces the corresponding overshoot as shown by voltage signal Vout1-RTN1 across the dynamic load 118-1.

More specifically, at time T81, the load release (IO1 to IO2) associated with the dynamic load 118-1 occurs. In a manner as previously discussed, the power converter 121-1 operates to provide negative current through the dynamic load 118-1. Between time T82 and T83, the controller 141 activates the low side switch circuitry QL-AUX (while high side switch circuitry QH-AUX is OFF), reducing a magnitude of the current supplied to the dynamic loads via the output signal 115. See current 820.

Between time T83 and T84, the controller 141 activates the high side switch circuitry QH-AUX (while low side switch circuitry QL-AUX is OFF), reducing a magnitude of the current supplied to the dynamic loads via the output signal 115. Note that before time T82 and after time T83, the controller 141 controls the high side switch circuitry and the low side switch circuitry in the auxiliary power converter 111-AUX in a tristate.

This temporary activation (such as one or more cycles of activating low side switch circuitry and high side switch circuitry such as between T82 and T84) of the auxiliary power converter 111-AUX reduces the overshoot (from dashed line 810 to voltage Vout1-RTN1) associated with the voltage Vout1-RTN1 across the dynamic load 118-1.

As further discussed below in FIG. 10, each of the dynamic loads 118-2, 118-3, etc., thus experiences a reduction in current associated with output signal 115 and aux current Iaux between T82 and T84, resulting in a voltage droop condition. However, as further discussed below, the respective power converter 121-2, power converter 121-3, etc., prevent the voltages across the dynamic loads 118-2, 118-3, etc., from falling below a threshold level.

In certain instances, note that multiple dynamic loads in the stack experience a same positive or negative transient power consumption condition. In such an instance, the controller 141 initiates activation of the auxiliary power converter in a manner as previously discussed to simultaneously reduce overshoot/undershoot voltages across those dynamic loads (which experience the transient power consumption condition) at the same time. However, if the feedback 105 indicates that there are an equal number of dynamic loads experiencing a negative transient power consumption condition and a positive transient power consumption condition, then the controller 141 does not activate the auxiliary power converter 111-AUX because there is no benefit in doing so.

Figure 9:
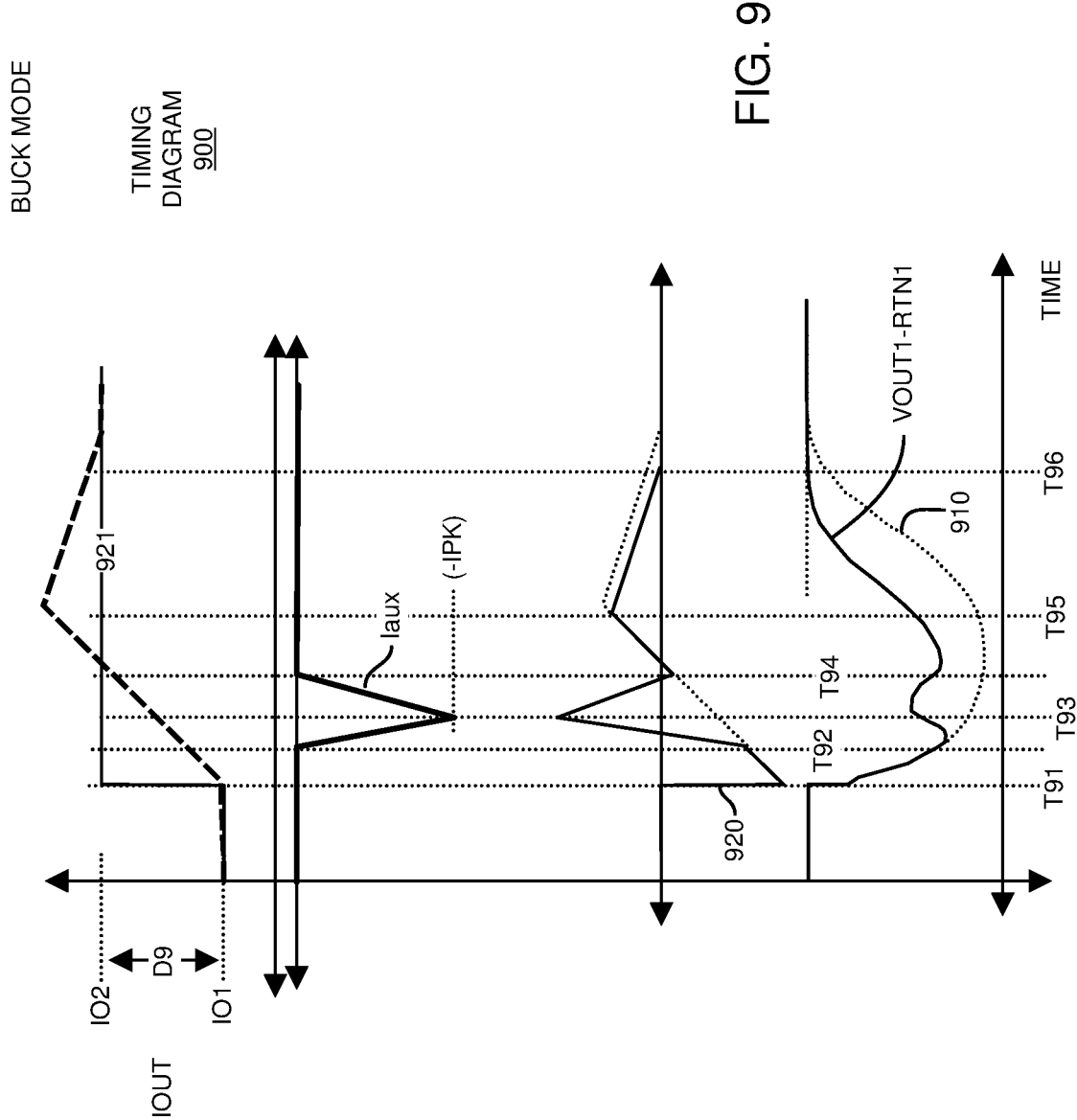
FIG. 9 is an example timing diagram illustrating operation of an auxiliary power converter in a boost mode to reduce variation of a voltage across a dynamic load in a series stack according to embodiments herein.

FIG. 9 is an example timing diagram illustrating operation of an auxiliary power converter in a buck mode to reduce variation of a voltage across a dynamic load according to embodiments herein. Note that current flows from high potential (Vin) to low potential (Vout1+ . . . +Vout4).

In this example embodiment in timing diagram 900, assume that the dynamic load 118-1 experiences a transient power consumption condition in which the dynamic load 118-1 consumes more power (as indicated by step up from IO1 to IO2, delta D9) than an amount of power provided by the output signal 115. Assume that none of the other dynamic loads 118-2, 118-3, etc., in the stack experiences a transient power consumption condition.

In such an instance, as previously discussed, the power converter 121-1 operates in a so-called buck mode to provide positive supplemental current through the dynamic load 118-1 to maintain the voltage (Vout1-RTN1) at a desired voltage level. Dashed line 910 indicates the voltage (Vout1-RTN1) decrease (greater undershoot condition) that would otherwise occur without activating the auxiliary power converter 111-AUX as further discussed below. The capacitor current 920 varies between time T91 and T96 as shown.

The feedback 105 indicates this transient power consumption condition occurring around time T91. In response to detecting the transient power consumption condition associated with the dynamic load 118-1, the controller 141 initiates activation of the auxiliary power converter 111-AUX in a so-called buck mode to generate Iaux which reduces the corresponding undershoot condition as shown by voltage signal Vout1-RTN1 across the dynamic load 118-1.

More specifically, at time T91, the load step (IO1 to IO2) associated with the dynamic load 118-1 occurs. In a manner as previously discussed, the power converter 121-1 operates to provide positive supplemental current through the dynamic load 118-1. Between time T92 and T93, the controller 141 activates the high side switch circuitry QH-AUX (while low side switch circuitry QL-AUX is OFF), increasing a magnitude of the current supplied to the dynamic loads via the output signal 115. Between time T93 and T94, the controller 141 activates the low side switch circuitry QL-AUX (while high side switch circuitry QH-AUX is OFF), increasing a magnitude of the current supplied to the dynamic loads via the output signal 115.

This temporary activation (such as one or more cycles/sequence of activating high side switch circuitry and low side switch circuitry) of the auxiliary power converter 111-AUX reduces the undershoot associated with the voltage Vout1-RTN1 across the dynamic load 118-1. Again, dashed line 910 indicates the voltage magnitude of Vout1-RTN1 that would otherwise occur if the auxiliary power converter 111-AUX was not activated between T92 and T94.

As further discussed below in FIG. 11, each of the dynamic loads 118-2, 118-3, etc., thus experiences an increase in current associated with output signal 115 and Iaux when the auxiliary power converter is activated between T82 and T84, resulting in a voltage increase condition during activation of the auxiliary power converter. However, as further discussed below, the respective power converter 121-2, power converter 121-3, etc., prevent the voltages across the dynamic loads 118-2, 118-3, etc., from raising above a threshold level.

Figure 10:
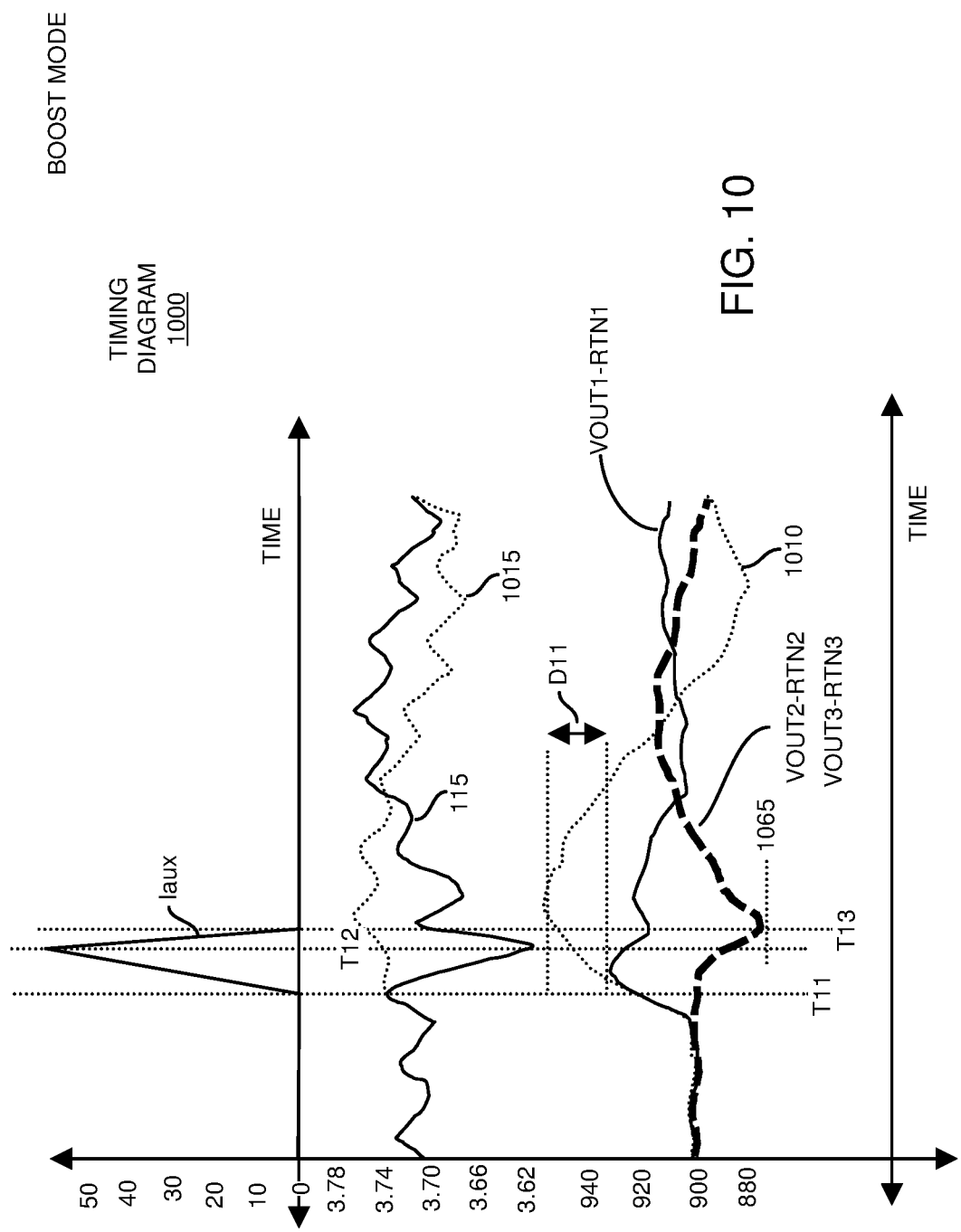
FIG. 10 is an example timing diagram illustrating operation of an auxiliary power converter in a boost mode to reduce variation of a voltage across a dynamic load in a series stack according to embodiments herein.

FIG. 10 is an example timing diagram illustrating operation of an auxiliary power converter in a boost mode to reduce variation of a voltage across a dynamic load according to embodiments herein.

In this example embodiment as shown in timing diagram 1000, assume again that the dynamic load 118-1 experiences a transient power consumption condition in which the dynamic load 118-1 consumes less power than an amount of power provided by the output signal 115. Assume that none of the other dynamic loads 118-2, 118-3, etc., in the stack experiences a transient power consumption condition.

In such an instance, as previously discussed, the power converter 121-1 operates in a so-called boost mode to provide negative supplemental current through the dynamic load 118-1 to maintain the voltage (Vout1-RTN1) at a desired voltage level. Dashed line 1010 indicates the voltage (Vout1-RTN1) increase (overshoot) that would occur without activating the auxiliary power converter 111-AUX as further discussed below.

As previously discussed, the controller 141 detects the transient power consumption condition via feedback 105 at or prior to time T11. In response to detecting the transient power consumption condition associated with the dynamic load 118-1, the controller 141 initiates activation of the auxiliary power converter 111-AUX in a boost mode to generate Iaux, which reduces the corresponding overshoot as shown by voltage signal Vout1-RTN1 across the dynamic load 118-1 (compared to dashed line 1010 indicating Vout1-RTN1 without activation of the auxiliary power converter).

More specifically, at time T11, the power converter 121-1 operates to provide negative current through the dynamic load 118-1. Between time T11 and T12, the controller 141 activates the low side switch circuitry QL-AUX (while high side switch circuitry QH-AUX is OFF), reducing a magnitude of the current supplied to the dynamic loads via the output signal 115. Between time T12 and T13, the controller 141 activates the high side switch circuitry QH-AUX (while low side switch circuitry QL-AUX is OFF), reducing a magnitude of the current supplied to the dynamic loads via the output signal 115. Signal 1015 indicates a magnitude of the output signal 115 that would otherwise occur without activating the auxiliary power converter 111-AUX.

Before time T11 and after time T13, note that the controller 141 controls the high side switch circuitry and the low side switch circuitry in the auxiliary power converter 111-AUX in a tristate.

This temporary activation (such as one or more cycles/sequence of activating low side switch circuitry and then high side switch circuitry) of the auxiliary power converter 111-AUX reduces the overshoot associated with the voltage Vout1-RTN1 across the dynamic load 118-1.

Figure 11:
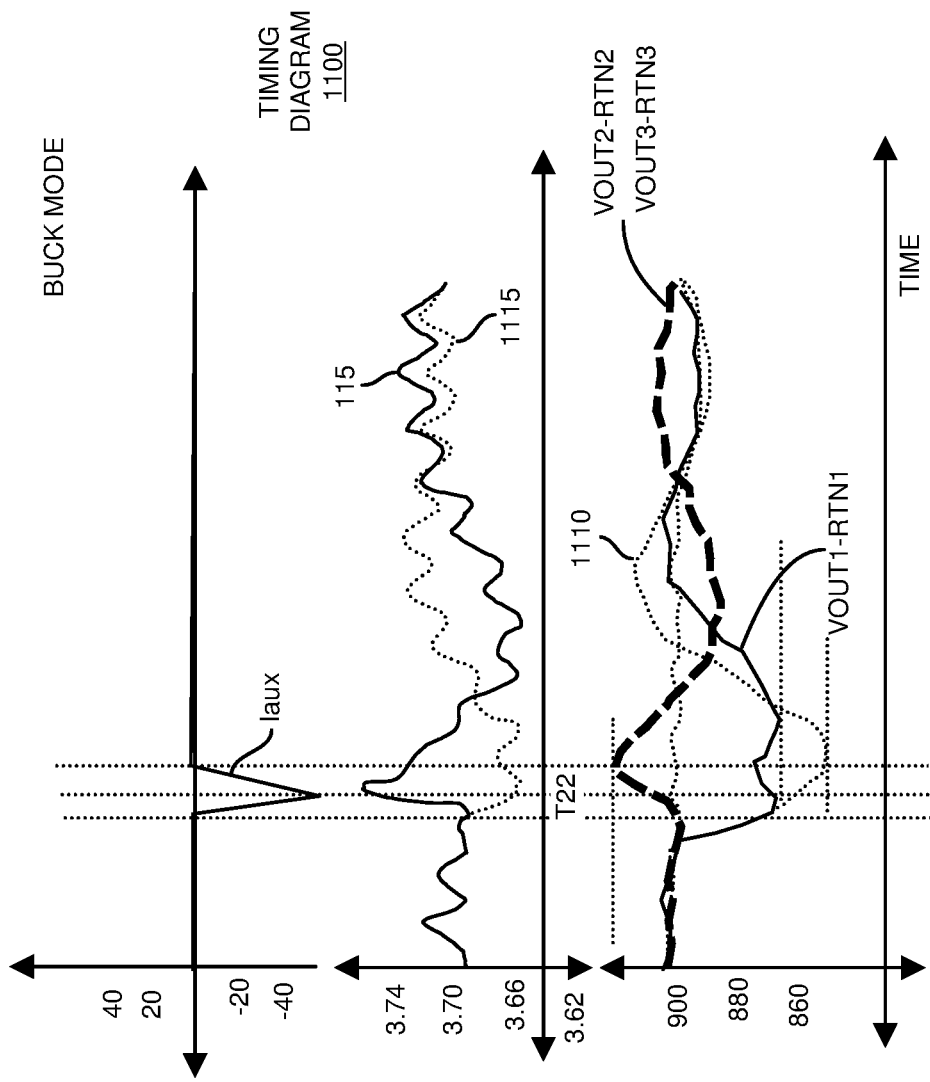
FIG. 11 is an example timing diagram illustrating operation of an auxiliary power converter in a buck mode to reduce variation of a voltage across a dynamic load in a series stack according to embodiments herein.

FIG. 11 is an example timing diagram illustrating operation of an auxiliary power converter in a buck mode to reduce variation of a voltage across a dynamic load according to embodiments herein.

In this example embodiment, in timing diagram 1100, assume that the dynamic load 118-1 experiences a transient power consumption condition in which the dynamic load 118-1 consumes more power than an amount of power provided by the output signal 115. Assume that none of the other dynamic loads 118-2, 118-3, etc., in the stack experiences a transient power consumption condition.

In such an instance, as previously discussed, the power converter 121-1 operates in a so-called buck mode to provide positive supplemental current through the dynamic load 118-1 to maintain the voltage (Vout1-RTN1) at a desired voltage level. Dashed line 1110 indicates the voltage (Vout1-RTN1) decrease (undershoot) that would occur without activating the auxiliary power converter 111-AUX as further discussed below.

The feedback 105 indicates this transient power consumption condition. In response to detecting the transient power consumption condition associated with the dynamic load 118-1, the controller 141 initiates activation of the auxiliary power converter 111-AUX in a buck mode to generate supplemental current Iaux which reduces the corresponding undershoot as shown by voltage signal Vout1-RTN1 across the dynamic load 118-1. More specifically, prior to time T21, the power converter 121-1 operates to provide positive supplemental current through the dynamic load 118-1. Additionally, between time T21 and T22, the controller 141 activates the high side switch circuitry QH-AUX (while low side switch circuitry QL-AUX is OFF), increasing a magnitude of the current supplied to the dynamic loads via the output signal 115. Between time T22 and T23, the controller 141 activates the low side switch circuitry QL-AUX (while high side switch circuitry QH-AUX is OFF), increasing a magnitude of the current supplied to the dynamic loads via the output signal 115. Signal 1115 indicates a magnitude of the output signal 115 that would otherwise occur without activating the auxiliary power converter 111-AUX.

This temporary activation (such as one or more cycles/sequence of activating high side switch circuitry and then low side switch circuitry) of the auxiliary power converter 111-AUX reduces the undershoot associated with the voltage Vout1-RTN1 across the dynamic load 118-1. Dashed line 1110 indicates the magnitude of the voltage Vout1-RTN1 that would have resulted without activation of the auxiliary power converter 111-AUX.

Timing diagram 1100 indicates that voltages Vout2-RTN2, Vout3-RTN3, etc., across respective dynamic load 118-2, 118-3, etc., experience a voltage increase during the buck mode operation of auxiliary power converter 111-A. However, the respective power converters 121-2, 121-3, etc., quickly regulate the respective voltages Vout2-RTN2, Vout3-RTN3, etc., back to a desired level.

Figure 12:
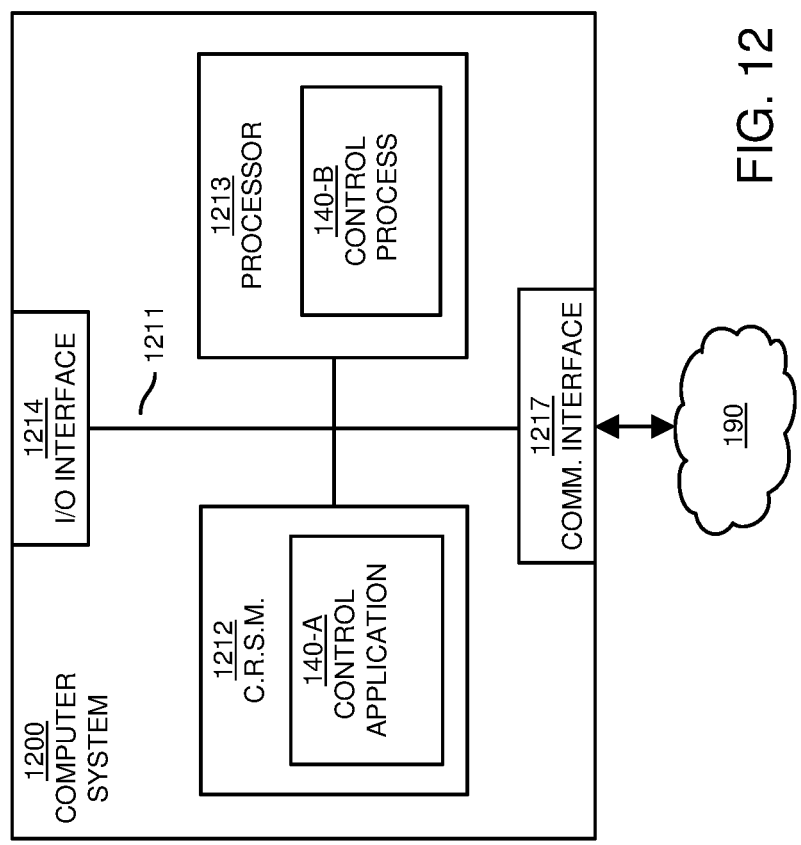
FIG. 12 is an example diagram illustrating computer processor hardware and related software instructions that execute methods according to embodiments herein.

FIG. 12 is an example block diagram of a computer device for implementing any of the operations as discussed herein according to embodiments herein.

As shown, computer system 1200 (such as implemented by any of one or more resources such as each of controllers 140, voltage regulator, etc.) of the present example includes an interconnect 1211 that couples computer readable storage media 1212 such as a non-transitory type of media (or hardware storage media) in which digital information can be stored and retrieved, a processor 1213 (e.g., computer processor hardware such as one or more processor devices), I/O interface 1214 (e.g., to output control signals to the power converter phases, monitor current, etc.), and a communications interface 1217.

I/O interface 1214 provides connectivity to any suitable circuitry such as power converter phases.

Computer readable storage medium 1212 can be any hardware storage resource or device such as memory, optical storage, hard drive, floppy disk, etc. In one embodiment, the computer readable storage medium 1212 stores instructions and/or data used by the controller application 140-A (such as implemented by any of controllers 140-1, 140-2, 140-3, etc.) to perform any of the operations as described herein.

Further in this example embodiment, communications interface 1217 enables the computer system 1200 and processor 1213 to communicate over a resource such as network 190 to retrieve information from remote sources and communicate with other computers.

As shown, computer readable storage media 1212 is encoded with controller application 140-A (e.g., software, firmware, etc.) executed by processor 1213. Controller application 140-A can be configured to include instructions to implement any of the operations as discussed herein.

During operation of one embodiment, processor 1213 accesses computer readable storage media 1212 via the use of interconnect 1211 in order to launch, run, execute, interpret or otherwise perform the instructions in controller application 140-A stored on computer readable storage medium 1212.

Execution of the controller application 140-A produces processing functionality such as controller process 140-B in processor 1213. In other words, the controller process 140-B associated with processor 1213 represents one or more aspects of executing controller application 140-A within or upon the processor 1213 in the computer system 1200.

In accordance with different embodiments, note that computer system 1200 can be a micro-controller device, logic, hardware processor, hybrid analog/digital circuitry, etc., configured to control a power supply and perform any of the operations as described herein.

Functionality supported by the different resources will now be discussed via flowchart in FIG. 13. Note that the steps in the flowcharts below can be executed in any suitable order.

Figure 13:
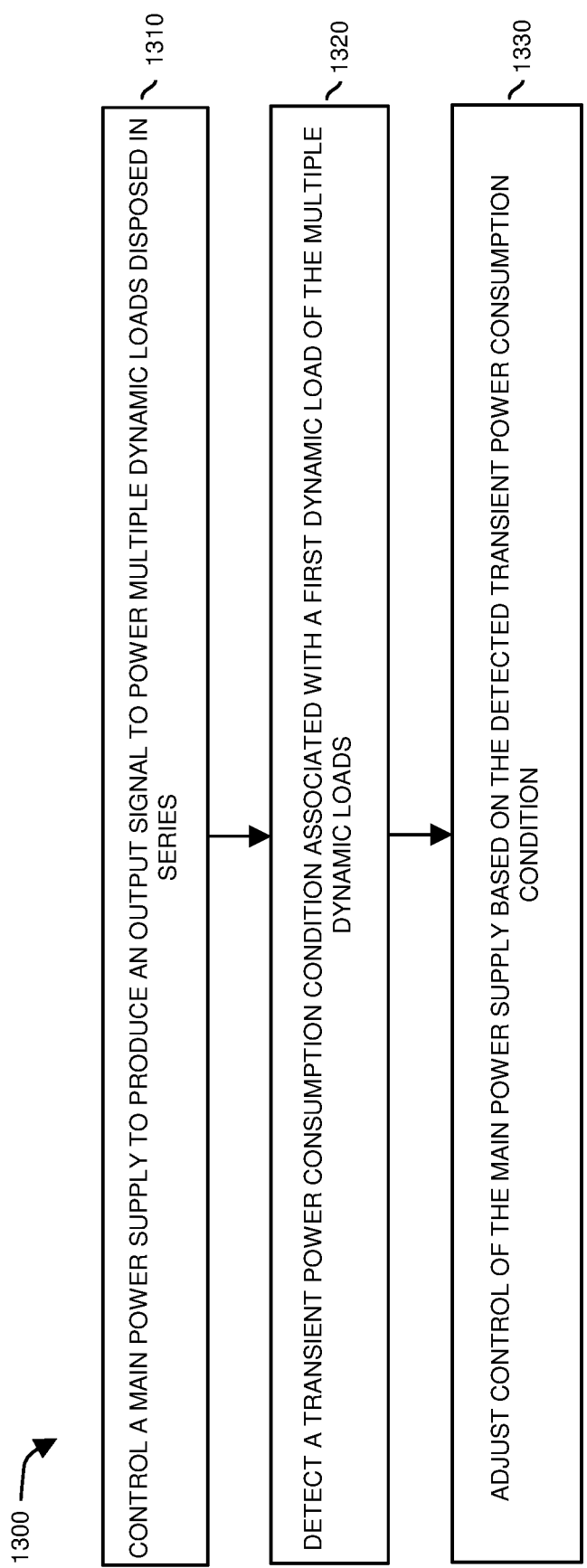
FIG. 13 is an example diagram illustrating a method according to embodiments herein.

FIG. 13 is an example diagram illustrating a method of controlling a power converter according to embodiments herein.

In processing operation 1310, the controller 141 controls the power supply 111 to produce an output signal 115 to power multiple dynamic loads 118 disposed in series.

In processing operation 1320, the controller detects a transient power consumption condition associated with one or more of the multiple dynamic loads 118.

In processing operation 1330, the controller 141 adjusts control of the power supply 111 based on the detected transient power consumption condition.

Figure 14:
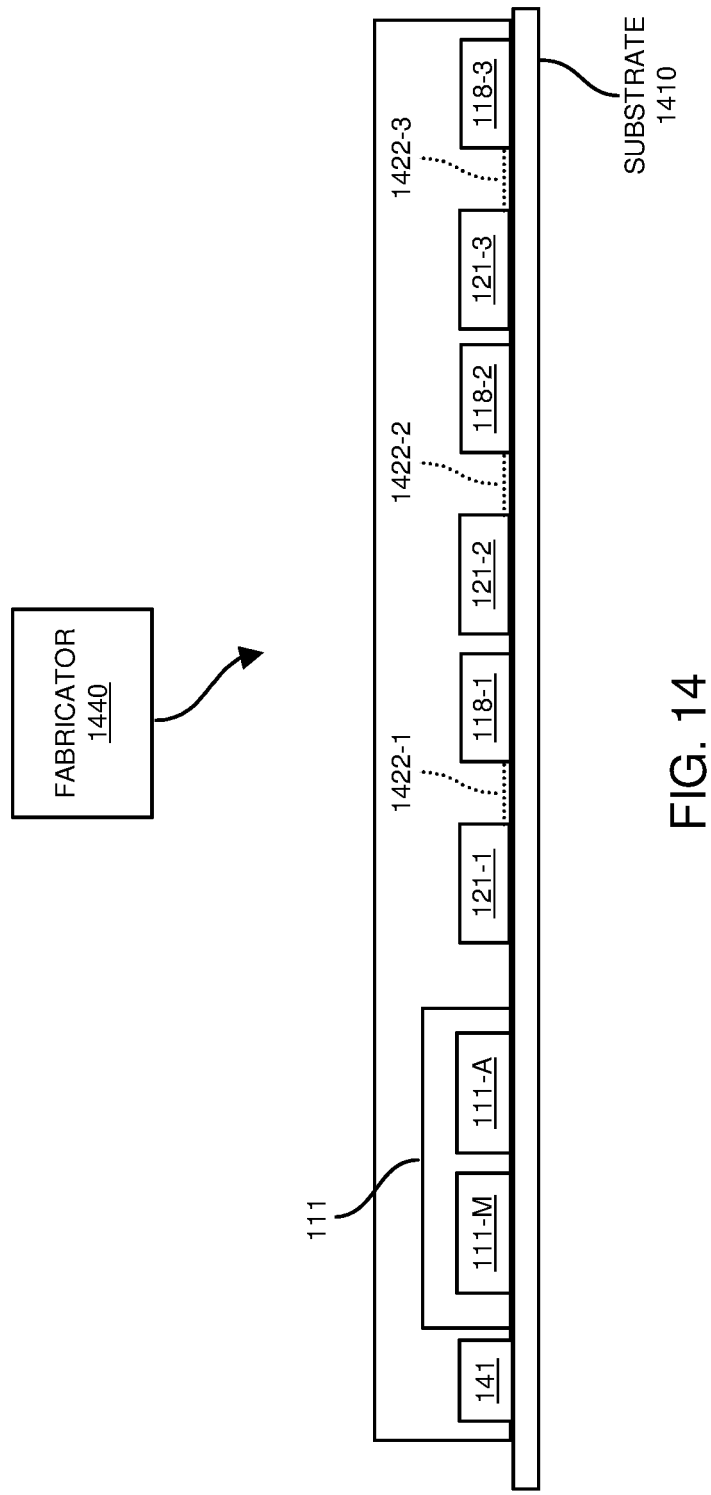
FIG. 14 is an example diagram illustrating assembly of a circuit according to embodiments herein.

FIG. 14 is an example diagram illustrating assembly of a power supply and multiple interconnected power converter phases on a circuit board according to embodiments herein.

In this example embodiment, assembler 1440 receives a substrate 1410 and corresponding components of system 100 in which to affix one or more components such as main power supply 111 (main power converter 111-M and auxiliary power converter 111-AUX), controller 141, power converters 121, dynamic loads 118, etc. The assembler 1440 affixes (couples) each power converter, main power supply, corresponding dynamic load, etc., onto the substrate 1410.

Via respective circuit paths 1422 (such as 1422-1, 1422-2, 1422-3, etc.) as described herein, the assembler 1440 provides connectivity between a respective voltage regulator and dynamic load. Note that components such as associated with the power converters 121, dynamic loads 118, main power supply 111, etc., can be affixed or coupled to the substrate 1410 in any suitable manner. For example, one or more of the components associated with the main power supply 111, power converters 121, and the dynamic loads 118 can be soldered to the substrate 1410, inserted into sockets disposed on the substrate 1410, etc.

Note further that the substrate 1410 is optional. Any of one or more circuit paths or connectivity as shown in the drawings and as described herein can be disposed in cables or other suitable medium.

In one nonlimiting example embodiment, one or more of the dynamic loads 118 and/or main power supply 111 and corresponding components are disposed on their own substrate independent of substrate 1410; the substrate of the loads 118 is directly or indirectly connected to the substrate 1410 via wires, cables, links, etc. The voltage regulators or any portion of the power supply controller and corresponding power converter phases can be disposed on a standalone smaller board plugged into a socket of the substrate 1410 as well.

Via one or more circuit paths 1422 (such as one or more traces, cables, connectors, wires, conductors, electrically conductive paths, etc.), the assembler 1440 couples the respective main power supply and stack of dynamic loads associated with provides connectivity of the power converters to the corresponding dynamic loads.

Accordingly, embodiments herein include a system comprising: a substrate 1410 (such as a circuit board, standalone board, mother board, standalone board destined to be coupled to a mother board, host, etc.); power converters 121 including corresponding components as described herein; main power supply 111, and loads 118.

Note again that each of the loads 118 or collection of dynamic loads can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 1410 or disposed at a remote location.

Note again that techniques herein are well suited for use in circuit applications such as those that implement feedback monitoring. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
   a controller operative to:
      control a power supply to produce an output signal to power multiple dynamic loads disposed in series, each respective dynamic load of the multiple dynamic loads powered by the output signal, each respective dynamic load also powered by a corresponding power converter coupled to the respective dynamic load;
      detect a transient power consumption condition associated with a first dynamic load of the multiple dynamic loads; and
      adjust control of the power supply and the output signal based on the detected transient power consumption condition; and
      wherein the transient power consumption condition is a detected variation in a magnitude of a differential voltage powering the first dynamic load, the differential voltage derived from the output signal, the detected variation received from a first power converter producing the differential voltage to power the first dynamic load.

2. The apparatus as in claim 1, wherein the controller is operative to detect the transient power consumption condition based on a variation in a magnitude of the output signal.

3. The apparatus as in claim 1, wherein the controller is further operative to: i) monitor a respective differential voltage across each of the multiple dynamic loads, and ii) adjust control of the power supply based on multiple simultaneous detected instances of transient power consumption conditions associated with the multiple dynamic loads.

4. The apparatus as in claim 1, wherein the controller is operative to receive a feedback signal from monitor hardware associated with the first dynamic load, the feedback indicating the transient power consumption condition associated with the first dynamic load.

5. The apparatus as in claim 1, wherein the controller is operative to receive a respective feedback signal from each of the multiple dynamic loads, the respective feedback signal indicating a corresponding transient power consumption condition of a corresponding dynamic load to which the respective feedback pertains.

6. The apparatus as in claim 1, wherein the controller is further operative to: adjust a magnitude of the output signal in response to the detected transient power consumption condition associated with the first dynamic load of the multiple dynamic loads.

7. The apparatus as in claim 6, wherein the adjustment of the magnitude of the output signal is operative to reduce a variation of a magnitude of a regulated voltage powering the first dynamic load with respect to a threshold value.

8. The apparatus as in claim 1, wherein the power supply includes a main power converter and an auxiliary power converter, the main power converter operative to produce the output signal to power the dynamic loads during non-transient dynamic load conditions prior to detection of the transient power consumption condition; and
   wherein the controller is operative to activate the auxiliary power converter to adjust a magnitude of the output signal in response to the detected transient power consumption condition associated with the first dynamic load.

9. The apparatus as in claim 1, wherein the controller is operative to operate an auxiliary converter of the power supply in a discontinuous conduction mode in response to the detected transient power consumption condition.

10. The apparatus as in claim 1, wherein the detected transient power consumption condition is a first transient power consumption condition; and
   wherein the controller is further operative to: i) detect a second transient power consumption condition associated with a second dynamic load of the multiple dynamic loads, and ii) adjust control of the power supply based on the detected first transient power consumption condition associated with the first dynamic load and the second transient power consumption condition associated with the second dynamic load.

11. The apparatus as in claim 1, wherein adjusted control of the power supply is operative to: i) reduce a variation in a first output voltage powering the first dynamic load with respect to a first setpoint voltage, and ii) increase a variation in a second output voltage with respect to a second setpoint voltage, the second output voltage powering a second dynamic load of the multiple dynamic loads.

12. The apparatus as in claim 11, wherein the first power converter controls a magnitude of the first output voltage powering the first dynamic load, the first power converter operative to regulate the first output voltage with respect to the first setpoint voltage; and wherein a second power converter controls a magnitude of the second output voltage powering the second dynamic load, the second power converter operative to regulate the second output voltage with respect to the second setpoint voltage.

13. A system comprising:
a circuit substrate; and
the apparatus of claim 1, the apparatus coupled to the circuit substrate.

14. A method comprising:
receiving a circuit substrate; and
coupling the apparatus of claim 1 to the circuit substrate.

15. The apparatus as in claim 1, wherein the power supply includes a main power converter and an auxiliary power converter operative to produce the output signal; and wherein the main power converter and the auxiliary power converter are connected in parallel to produce the output signal.

16. The apparatus as in claim 1, wherein the power supply includes a main power converter and an auxiliary power converter operative to produce the output signal, the auxiliary power converter being a buck converter.

17. The apparatus as in claim 1, wherein the power supply includes a main power converter and an auxiliary power converter to produce the output signal; and wherein the auxiliary power converter includes an inductor operative to output auxiliary current to produce the output signal.

18. The apparatus as in claim 1, wherein the differential voltage is a first differential voltage;

wherein the output signal is an output current produced by the power supply, the output current passing through each of the multiple dynamic loads;

wherein the multiple dynamic loads include the first dynamic load and a second dynamic load;

wherein the first power converter of multiple power converters produces the first differential voltage applied to power the first dynamic load, a combination of the output signal and the first differential voltage powering the first dynamic load; and wherein a second power converter of the multiple power converters produces a second differential voltage applied to power the second dynamic load, a combination of the output signal and the second differential voltage powering the second dynamic load.

19. The apparatus as in claim 1, wherein each corresponding power converter is operable to provide supplemental positive or negative current to the respective dynamic load on an as-needed basis depending on a magnitude of power consumption by the respective dynamic load.

20. The apparatus as in claim 1, wherein each of the dynamic loads has a floating ground reference that is independent of a second ground associated with the power supply.

21. The apparatus as in claim 1, wherein the output signal is main output current generated by the power supply; and wherein the first dynamic load is powered by a combination of the main output current and first supplemental output current generated by the first power converter, the first supplemental output current powering only the first dynamic load of the multiple dynamic loads; and wherein a second dynamic load of the multiple dynamic loads is powered by a combination of the main output current and second supplemental output current generated by a second power converter, the second supplemental output current powering only the second dynamic load of the multiple dynamic loads.

22. The apparatus as in claim 1, wherein the first power converter is operative to produce a first differential output voltage applied to power the first dynamic load, the first power converter operating independently of the power supply to power the first dynamic load.

23. A method comprising:
controlling a power supply to produce an output signal to power multiple dynamic loads disposed in series, each respective dynamic load of the multiple dynamic loads powered by the output signal, each respective dynamic load also powered by a corresponding power converter coupled to the respective dynamic load;

detecting a transient power consumption condition associated with a first dynamic load of the multiple dynamic loads;

adjusting control of the power supply and the output signal based on the detected transient power consumption condition; and wherein the transient power consumption condition is a detected variation in a magnitude of a differential voltage powering the first dynamic load, the differential voltage derived from the output signal, the detected variation received from a first power converter producing the differential voltage to power the first dynamic load.

24. The method as in claim 23 further comprising:
detecting the transient power consumption condition based on a variation in a magnitude of the output signal.

25. The method as in claim 23 further comprising:
monitoring a respective differential voltage across each of the multiple dynamic loads, and ii) adjusting control of the power supply based on multiple simultaneous detected instances of transient power consumption conditions associated with the multiple dynamic loads.

26. The method as in claim 23 further comprising:
receiving a feedback signal from monitor hardware associated with the first dynamic load, the feedback signal indicating the transient power consumption condition associated with the first dynamic load.

27. The method as in claim 23 further comprising:
receiving a respective feedback signal indicating a corresponding transient power consumption condition associated with each of the multiple dynamic loads.

28. The method as in claim 23 further comprising:
adjusting a magnitude of the output signal in response to the detected transient power consumption condition associated with the first dynamic load of the multiple dynamic loads.

29. The method as in claim 28 further comprising:
via the adjustment to the magnitude of the output signal, reducing a variation of a magnitude of a regulated voltage powering the first dynamic load.

30. The method as in claim 23 further comprising:
producing the output signal to power the dynamic loads during non-transient dynamic load conditions prior to detection of the transient power consumption condition; and activating an auxiliary power converter to adjust a magnitude of the output signal in response to the transient power consumption condition associated with the first dynamic load.

31. The method as in claim 23 further comprising:
operating an auxiliary converter of the power supply in a discontinuous conduction mode in response to the detected transient power consumption condition.

32. The method as in claim 23, wherein the detected transient power consumption condition is a first transient power consumption condition, the method further comprising:
i) detecting a second transient power consumption condition associated with a second dynamic load of the multiple dynamic loads, and
ii) adjusting control of the power supply based on the detected first transient power consumption condition associated with the first dynamic load and the second transient power consumption condition associated with the second dynamic load.

33. The method as in claim 23, wherein the output signal powers each of the multiple dynamic loads; and
wherein the adjusting control of the power supply: i) reduces a variation in a first output voltage powering the first dynamic load with respect to a first setpoint voltage, and ii) increases a variation in a second output voltage with respect to a second setpoint voltage, the second voltage powering a second dynamic load of the multiple dynamic loads.

34. The method as in claim 33 further comprising:
implementing the first power converter to control a magnitude of the first output voltage powering the first dynamic load, the first power converter regulating the first output voltage with respect to the first setpoint voltage; and
implementing a second power converter to control a magnitude of the second output voltage powering the second dynamic load, the second power converter regulating the second output voltage with respect to the second setpoint voltage.

35. An apparatus comprising:
a controller operative to:
control a power supply to produce an output signal to power multiple dynamic loads disposed in series, each respective dynamic load of the multiple dynamic loads powered by the output signal, each respective dynamic load also powered by a corresponding power converter coupled to the respective dynamic load;
detect a transient power consumption condition associated with a first dynamic load of the multiple dynamic loads;
adjust control of the power supply and the output signal based on the detected transient power consumption condition;
wherein the power supply includes a main power converter and an auxiliary power converter, the main power converter operative to produce the output signal to power the dynamic loads during non-transient dynamic load conditions prior to detection of the transient power consumption condition;
wherein the controller is operative to activate the auxiliary power converter to adjust a magnitude of the output signal in response to the detected transient power consumption condition associated with the first dynamic load; and
wherein the auxiliary power converter includes multiple switches, states of the multiple switches controlled based on respective feedback signals, the respective feedback signals including: i) a first feedback signal indicating a first power consumption condition associated with a first dynamic load of the multiple dynamic loads, and ii) a second feedback signal indicating a second power consumption condition of a second dynamic load of the multiple dynamic loads.

36. An apparatus comprising:
a controller operative to:
control a power supply to produce an output signal to power multiple dynamic loads disposed in series, each respective dynamic load of the multiple dynamic loads powered by the output signal, each respective dynamic load also powered by a corresponding power converter coupled to the respective dynamic load;
detect a transient power consumption condition associated with a first dynamic load of the multiple dynamic loads; and
adjust control of the power supply and the output signal based on the detected transient power consumption condition;
wherein the output signal is an output current produced by the power supply, the output current passing through each of the multiple dynamic loads;
wherein the multiple dynamic loads include the first dynamic load and a second dynamic load;
wherein a first power converter of multiple power converters produces a first differential voltage applied to power the first dynamic load, a combination of the output signal and the first differential voltage powering the first dynamic load; and
wherein a second power converter of the multiple power converters produces a second differential voltage applied to power the second dynamic load, a combination of the output signal and the second differential voltage powering the second dynamic load;
wherein the first power converter is operative to regulate a magnitude of the first differential voltage with respect to a first setpoint reference voltage; and
wherein the second power converter is operative to regulate a magnitude of the second differential voltage with respect to a second setpoint reference voltage.

37. The apparatus as in claim 36, wherein the power supply includes a main power converter and an auxiliary power converter, the main power converter operative to produce the output current to power the dynamic loads during non-transient dynamic load conditions prior to detection of the transient power consumption condition;
wherein the controller is operative to activate the auxiliary power converter to adjust a magnitude of the output current in response to the detected transient power consumption condition associated with the first dynamic load; and
wherein the controller is operative to detect the transient power consumption condition associated with the first dynamic load based on: i) a first feedback signal indicating a change in current consumption by the first dynamic load, and ii) a second feedback signal indicating a change in current consumption by the second dynamic load.

38. An apparatus comprising:
a controller operative to:
control a power supply to produce an output signal to power multiple dynamic loads disposed in series, each respective dynamic load of the multiple dynamic loads powered by the output signal, each respective dynamic load also powered by a corresponding power converter coupled to the respective dynamic load;

detect a transient power consumption condition associated with a first dynamic load of the multiple dynamic loads;

adjust control of the power supply and the output signal based on the detected transient power consumption condition;

wherein the output signal is main output current generated by the power supply;

wherein the first dynamic load is powered by a combination of the main output current and first supplemental output current generated by a first power converter, the first supplemental output current powering only the first dynamic load of the multiple dynamic loads; and wherein a second dynamic load of the multiple dynamic loads is powered by a combination of the main output current and second supplemental output current generated by a second power converter, the second supplemental output current powering only the second dynamic load of the multiple dynamic loads;

wherein the transient power consumption condition is a first transient power consumption condition;

wherein a polarity of the first supplemental output current from the first power converter is positive during the first detected transient power consumption condition to prevent a magnitude of a first differential voltage across the first dynamic load from falling below a threshold level; and wherein the polarity of the first supplemental output current from the first power converter is negative during a second detected transient power consumption condition to prevent a magnitude of the first differential voltage across the first dynamic load from raising above the threshold level.

39. An apparatus comprising:

a controller operative to:

control a power supply to produce an output signal to power multiple dynamic loads disposed in series, each respective dynamic load of the multiple dynamic loads powered by the output signal, each respective dynamic load also powered by a corresponding power converter coupled to the respective dynamic load;

detect a transient power consumption condition associated with a first dynamic load of the multiple dynamic loads;

adjust control of the power supply and the output signal based on the detected transient power consumption condition;

wherein a first power converter is operative to produce a first differential output voltage applied to power the first dynamic load, the first power converter operating independently of the power supply to power the first dynamic load; and wherein the controller is operative to detect the transient power consumption condition associated with the first dynamic load based on a first feedback signal from the first power converter indicating a change in current consumption by the first dynamic load.

* * * * *